(12) United States Patent
Morningstar et al.

(10) Patent No.: US 11,675,850 B2
(45) Date of Patent: *Jun. 13, 2023

(54) PROVIDING EFFICIENT GRAPHICAL USER INTERFACES FOR VISUALIZING LARGE DATASETS

(71) Applicant: Qualtrics, LLC, Provo, UT (US)

(72) Inventors: Jamie Morningstar, Orem, UT (US); Daan Lindhout, Seattle, WA (US); Shan Gao, Seattle, WA (US); Ryan Debenham, Provo, UT (US)

(73) Assignee: Qualtrics, LLC, Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/493,255

(22) Filed: Oct. 4, 2021

(65) Prior Publication Data

US 2022/0138265 A1 May 5, 2022

Related U.S. Application Data

(63) Continuation of application No. 16/901,977, filed on Jun. 15, 2020, now Pat. No. 11,138,271.

(51) Int. Cl.
*G06F 16/9038* (2019.01)
*G06Q 30/0201* (2023.01)
*G06F 3/04842* (2022.01)

(52) U.S. Cl.
CPC ...... *G06F 16/9038* (2019.01); *G06F 3/04842* (2013.01); *G06Q 30/0201* (2013.01)

(58) Field of Classification Search
CPC .................................................. G06F 16/9038
See application file for complete search history.

(56) References Cited

U.S. PATENT DOCUMENTS

| 7,050,997 | B1 | 5/2006 | Wood, Jr. | |
| 2013/0091432 | A1* | 4/2013 | Shet | G08B 13/19645 715/719 |
| 2014/0136381 | A1 | 5/2014 | Joseph et al. | |
| 2014/0298235 | A1* | 10/2014 | Caldwell | G06Q 40/12 715/772 |
| 2019/0236661 | A1* | 8/2019 | Hogg | G06F 16/9537 |

OTHER PUBLICATIONS

U.S. Appl. No. 16/901,977, Feb. 16, 2021, Office Action.
U.S. Appl. No. 16/901,977, Jun. 2, 2021, Notice of Allowance.

* cited by examiner

*Primary Examiner* — Roland J Casillas
(74) *Attorney, Agent, or Firm* — Keller Preece PLLC

(57) ABSTRACT

The present disclosure relates to systems, non-transitory computer-readable media, and methods for efficiently providing a graphical user interface for visualizing large amounts of data on a single interface. In particular, in one or more embodiments, the disclosed systems utilize topic hierarchies and multidata display elements to intuitively present many types of data for many topics on a single interface. The system also uses an activatable timeline to visualize changes to large amounts of data over time.

20 Claims, 17 Drawing Sheets

PROVIDING EFFICIENT GRAPHICAL USER INTERFACES FOR VISUALIZING LARGE DATASETS

CROSS-REFERENCE TO RELATED APPLICATIONS

The present application is a continuation of U.S. application Ser. No. 16/901,977, filed on Jun. 15, 2020. The aforementioned application is hereby incorporated by reference in its entirety.

BACKGROUND

Recent years have seen significant improvements in the collection and storage of large amounts of data to gain insight and knowledge about various topics. For example, various businesses use digital survey systems to collect information from their customers to attempt to understand how to improve products and services. Due to the prevalence of digital communications, digital survey systems can now collect large amounts of data from thousands or even millions of users. While there have been improvements in the collection and storage techniques of large amounts of data, conventional systems often fail to fully realize the insights that can be gained from large datasets due to the inability to provide users an efficient and effective way to interact with and understand the large datasets. Indeed, the limited data reporting capabilities of most conventional systems often result in a time-intensive report building process that ultimately can result in inaccurate conclusions and incorrect decisions.

To illustrate, many conventional systems provide data reporting systems that are difficult to navigate and inefficient at creating reports. For example, conventional systems often provide a "report builder" interface that allows a user to define report parameters, and then once the parameters are defined, the user may "run the report" causing the system to apply the report parameters against the large dataset to generate the report. To define parameters, typical report builder interfaces have a user select from a large number of options, including but not limited to, types of data to include in the report, time period for the report, format of the report, data filters, as well as numerous other options. Indeed, the number of parameters can become overwhelming when considering the amount of data types and the various different formats of reports a user may want to build to try and visualize the data. The amount of parameter options often leads to a user providing numerous different selections and interactions in a time-consuming multiple-layer graphical interface process within a report builder interface to define parameters for even a single report. Moreover, if the resulting report does not provide the insight or information the user wanted, the user may have to start over and further define or redefine the report parameters.

In addition to the inefficiencies of typical report building interfaces, the conventional process of generating a report based on defined report parameters further adds to the inefficiency of conventional systems. For example, applying a set of report parameters to a large dataset may consume large amounts of processing and communication bandwidth to generate the report. Indeed, even with the most state of art computer hardware, with large datasets the process of mining data to generate the report can take several minutes or longer. Moreover, based on the nature of conventional report builders, a user often generates several reports to attempt to visualize connections between different data points and/or time intervals. For example, to visualize how customer response data changes over time, a user may run many different reports at many different time intervals. Accordingly, conventional systems often provide a report builder interface that experiences report lag as processing and communication resources are stretched thin during the generation of the numerous reports.

After reports are generated, conventional systems typically provide a report viewer interface that causes a user to navigate through many different interface pages of data or data visualizations. For example, if a user wanted to know how perceived product quality related to increased sales, the system may only be able to provide that data in various pieces after the user clicks through many sales reports for many months and through many survey reports for many months. This requires excessive interaction with the report viewer interface, and as such conventional systems often fail to provide a user-friendly presentation of large datasets.

Additionally, because conventional systems require many interactions in order to define report parameters and view report results, conventional systems are unable to use a user's (e.g., a survey administrator) interactions to understand reporting patterns or potential user interests in the data. For example, if a user wanted to inspect information related to a month in which sales significantly increased, the user may build and view many months of sales reports to find representative months in which sales have increased. However, because many of the user's interactions with a conventional system are based on the user sorting through uninteresting data, conventional systems are unable to make accurate conclusions from the user's interactions with the report interface because many of the user's interactions, if not most, were not actually relevant to the user's interest. Accordingly, conventional systems are unable to accurately recognize data in which the user is interested.

These along with additional problems and issues exist with regard to conventional systems.

BRIEF SUMMARY

Embodiments of the present disclosure provide benefits and/or solve one or more of the foregoing or other problems in the art with systems, non-transitory computer-readable media, and methods for an improved user interface for displaying and visualizing large amounts of data on computer devices. For example, the systems and methods provide a report management system for simultaneously visualizing large amounts of different types of data for presentation to a user via a computer device. For instance, the systems and methods provide, within a graphical user interface, a multidata display element that displays multiple types of data in a single display element. Further, in some embodiments, the systems and methods dynamically update the multidata display element within the graphical user interface to provide intuitive visualizations of changes to the multiple types of data over various time frames with a reduced number of needed user interactions.

The systems and methods also allow a user to interact with a multidata display element to provide additional visualizations and insights related to the data reported in the multidata display element. For example, upon a user interacting with the multidata display element, the systems and methods can provide, within the graphical user interface, a hierarchy of sub-multidata display elements that provides interactive data visualizations that intuitively provide important insights. Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
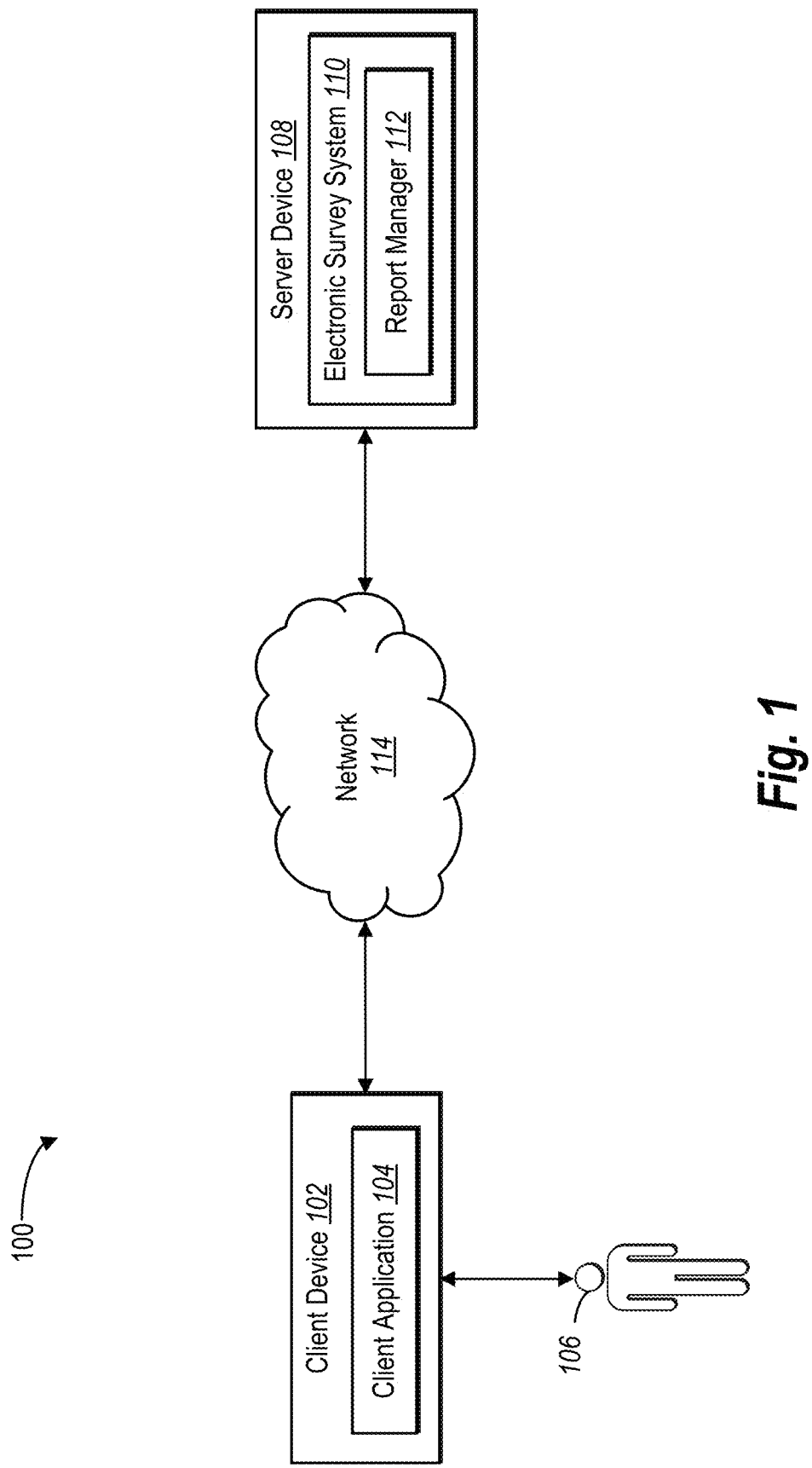
FIG. 1 illustrates a block diagram of a report manager system in accordance with one or more embodiments.

One or more embodiments disclosed herein provide a report management system for generating visualizations for large amounts of data within a graphical user interface. Various embodiments of the report management system generate and provide a multidata display element to visualize large datasets so the system can provide a display of many types of data simultaneously, on a single interface, and within a single display element. Additionally, embodiments of the report management system dynamically visualize large datasets by animating data changes within a multidata display element over time so that a user can easily recognize trends, dependencies, and/or other aspects of the various types of data within the large dataset. Further, in one or more embodiments the report management system generates hierarchies of visualizations to efficiently present views of various sub-categories of data that contribute to a larger set of data. For example, upon detecting a user interaction with the multidata display element, the report management system generates sub-multidata display elements that provides granular visualizations of the data that supports the selected multidata display element to allow a user to quickly "drill down" on contributing factors with only a single user interaction, which is significantly fewer interactions compared to conventional systems.

As briefly mentioned, example embodiments of the report management system enable a client device to display a multidata display element that visualizes multiple types of data from a dataset within a single graphical user interface and using a single display element. For example, the multidata display element includes visualizations of multiple types of data in a single graphical element to allow a user to easily view and analyze many aspects of a dataset within a single graphical user interface, within a single display element, and with minimal user interaction steps compared to conventional systems. For example, the multidata display element may represent data related to a topic and may display multiple types of data from the dataset related to the topic. In some examples, the report management system provides several multidata display elements for display in a single graphical user interface, and thus the report management system provides multiple types of data for multiple categories of data simultaneously on a single graphical user interface.

In order to visualize multiple types of data within a single multidata display element, the report management system generates various visualization portions of the multidata display element. In particular, in some embodiments the multidata display element includes multiple visualization portions that correspond to different data types. For example, and as will be explained in further detail below, a multidata display element can include a first portion (e.g., a central circular portion) that visualizes a first type of data via a size, a color, and/or another property of the first portion. In addition, the multidata display element can include a second portion (e.g., active display elements forming a circular bar graph around the central portion) that visualizes a second type of data related to the first type of data. In addition, the multidata display element can include a third portion (e.g., an activatable display element) that provides additional detail regarding the first two types of data and/or provides a third type of data. For example, the multidata display element can selectively provide the third portion based on a user interacting with the multidata display element (e.g., hovering a curser over the multidata display element).

In addition to the various visualization portions of the multidata display element, example embodiments of the report management system can also provide dynamic multidata display element visualizations to efficiently visualize changes to the various types of data within a multidata display element across various timeframes. For example, the report management system can generate a multidata display element corresponding to different time intervals (e.g., per month). In addition, the report management system can provide a timeline and a selectable timeline activation button within the graphical user interface that allows a user to easily activate the dynamic visualization with a single selection of the timeline activation button. For instance, upon a user interacting with the timeline activation button, the report management system can provide a dynamic visualization that animates changes to the various visualization portions of the multidata display element to visualize changes to the data from one time interval to the next.

In addition to providing a user with dynamic data visualizations over different time intervals with a single user interaction, the report management system also provides more detailed or granular visualizations of data in response to a single user interaction. For example, the report management system can generate a hierarchy of visualizations that allow a user to seamlessly drill down to more granular data that supports a top-level visualization. In some embodiments, for instance, based on detecting a user interaction with a top-level multidata display element, the report management system can provide sub-multidata display elements that include visualizations for sub-categories corresponding to the topic associated with the top-level multidata display element. Thus, the report management system provides granular level visualizations while minimizing the number of user interactions needed to access the granular level visualizations (e.g., a single user interaction).

Based on the general principles discussed above, as well as the details discussed below, the report management system improves upon conventional data reporting technology by providing a graphical user interface that efficiently and intuitively provides access to large dataset visualizations. For example, unlike conventional systems that often cause a user to generate a separate report for each type of data, the report management system reduces the amount of user interactions needed to access data by generating multidata display elements that simultaneously present many types of data for many categories of a large dataset. Thus, unlike conventional methods, the report management system provides a graphical user interface and graphical user interface elements that allow a user to locate and analyze data of interest with significantly fewer interactions because the data is intuitively provided via a single graphical user interface and within single multidata display elements.

Furthermore, the report management system provides a graphical user interface for dynamically animating visualizations to show changes in data over time. For example, the report management system provides a timeline activation button that, when selected, causes the report management system to generate an animated sequence that shows changes in multidata display elements (e.g., change in size, location, color, etc.) over different time periods based on a single user interaction with the timeline activation button. In contrast to conventional systems that often require that the user define and request multiple reports for each type of data corresponding to each different time period, the report management system efficiently generates and provides data visualizations that allow a user to understand data trends over time for multiple categories of data and multiple types of data with a single user interaction. Accordingly, the report management system provides improved graphical user interface technology to efficiently allow a user to navigate and understand large data sets while minimizing and reducing the amount of user interactions and user input needed compared to conventional systems.

Additionally, the report management system overcomes disadvantages of conventional systems that relate to providing data at a more granular level. Indeed, with conventional systems, when a user desires to view underlying supporting data, the user often must customize, define, and request a separate report, which can be a time-intensive process from both a user and a computer processer perspective depending on the amount and types of supporting data. In contrast, because the report management system can provide multiple multidata display elements corresponding to multiple categories of large data on a single interface, the report management system efficiently allows a user to locate and analyze data of interest. Further, because the report management system provides a hierarchy of data visualizations, a user can efficiently locate and understand the granular data that contributes to a larger data topic, view the ways that sub-topics change over time, and analyze how the sub-categories interact with one another with minimal user input compared to conventional systems.

The report management system is also able to accurately monitor user interactions with the reporting interface to meaningfully interpret a user's interests. The report management system enables a user to interact almost exclusively with data visualizations of interest because various types of data, trends in data, and categories of data are available, or easily accessed from, a single graphical user interface. Thus, and in contrast to conventional systems, because the report management system provides a streamlined and easy to understand graphical user interface, the user can avoid interacting with data in which the user is not interested. Accordingly, and in contrast to conventional systems that require numerous meaningless user interactions, the report management system can accurately and efficiently collect accurate user data to determine a user's interests, and use determined user interests within a feedback loop to provide relevant and useful data to a user. In some embodiments, the report management system uses a user's interests to automatically generate additional reports or provide report suggestions to a user.

As illustrated by the foregoing discussion, the present disclosure utilizes a variety of terms to describe features and advantages of the report management system. Additional detail is now provided regarding the meaning of such terms.

For example, as used herein, the term "graphical user interface" refers to a computer generated interface that allows a user to interact with a client device through computer graphic visual indicators presented by a computer display (e.g., a computer monitor or screen). For example, a "graphical user interface" can include icons, selectable visual components, and display elements. To illustrate, a graphical user interface can include a report interface area and various data cards that display data in graphs, charts, comments, or word clouds. In addition, the graphical user interface can include multidata display elements, timelines, etc. The report management system can provide information to a client device that causes the client device to generate a graphical user interface and/or populate a graphical user interface with various graphical components and elements.

As used herein, the term "data" refers to electronic information. While the report management system disclosed herein is often discussed in terms of electronic survey response data or other data relating to electronic surveys, the described principles and functions of the report can be applied to a wide-variety of data received or generated from various sources. Generally, and as discussed herein, there are various types and categories of data. As used herein, a "data type" refers to a specific kind of electronic information, while a "data topic" refers multiple data types that are related to each other. For example, with regards to electronic survey response data, a first data type can be survey responses to a first survey question, and a second data type can be survey responses to a second survey question. In addition, the first data type and the second data type can be related to each other because both the first survey question and the second survey question ask questions about the same product. Thus, the first data type and the second data type are included in the same data topic (e.g., product experience). Data types and data topics can be user or system defined.

As used herein, the term "report" refers to a summary and/or representation of a collection of data. For example, the term "report" can refer to textual and/or graphical visualizations of data generated by the report management system (either automatically or based on user input). To illustrate, a report can include display elements and/or textually annotated/labeled display elements. As used herein, the term "graphical visualization" or simply a "visualization" refers to computer-generated graphics, images, diagrams, charts, and/or animations to visually communicate and represent data.

As used herein, the term "multidata display element" refers to a computer-generated visualization element that displays multiple types of data at once. In some examples, a multidata display element can visualize different types of data that are part of the same topic, however, in other embodiments a multidata display element can display different data types belonging to different data categories. To illustrate, a multidata display element can display different types of data or attributes of a single data type using a combination of multiple display elements, sizes of display elements, colors of display elements, locations of display elements, and/or overall location of the multidata display element. As will be explained in detail below, a multidata display element provides a visualization that represents different types of data and/or different characteristics about data in a single graphical element.

Additional features and characteristics of one or more embodiments of the system are described below with respect to the Figures. For example, FIG. 1 illustrates a block diagram of an example embodiment of a report management system 100 (or simply "system 100"). In general, and as illustrated in FIG. 1, the system 100 includes a client device 102 including a client application 104. Additionally, the client device 102 may be associated with a user 106. The client device 102 communicates with server device(s) 108, over a network 114. As will be described in greater detail below, the client device 102 can perform or provide the various functions, features, processes, methods, and systems as described herein. Additionally, or alternatively, the server device(s) 108 can perform or provide the various functions, features, processes, methods and systems as described herein. In one or more embodiments, the client device 102 and server device(s) 108 coordinate together to perform or provide the various functions, features, processes, methods and systems, as described in more detail below.

Generally, the client device 102 can include any one of various types of client devices. For example, the client device 102 can be a mobile device (e.g., a smart phone), tablet, laptop computer, desktop computer, or any other type of computing device as further explained below with reference to FIG. 9. Additionally, the client application 104 can include any one of various types of client applications. For example, the client application 104 can be a web browser, and a user at the client device 102 may enter a Uniform Resource Locator (URL) or other address directing the web browser to access the report manager 112 on the server device(s) 108. Alternatively, the client application can be a native application installed and executed on the client device 102.

Additionally, the server device(s) 108 can include one or more computing devices including those explained below with reference to FIG. 9. The client device 102, server device(s) 108, and network 114 may communicate using any communication platforms and technologies suitable for transporting data and/or communication signals, including any known communication technologies, devices, media, and protocols supportive of data communications, examples of which are described with reference to FIG. 10.

Although not a requirement, in one embodiment the report management system 112 can be part of an electronic survey system. Accordingly, as shown in FIG. 1, the server device(s) 108 hosts an electronic survey system 110 (or simply survey system 110), which includes the report manager 112. In one or more embodiments, the survey system 110 collects survey responses to generate datasets (e.g., by administering an electronic survey through client devices associated with respondent users) and the report manager 112 generates and manages reports related to the datasets within the survey system 110. In other embodiments, the server device(s) 108 can include a system other than survey system 110 for collecting, generating, accessing, or otherwise managing datasets. Additionally, the server device(s) 108 can receive datasets via the network 114 from the client device 102 or from another source.

As an initial overview of the report management system 100, the server device(s) 108 can receive report parameters, or access report parameters, to apply to a dataset. Based on the report parameters, the server device(s) 108 builds one or more reports in accordance with the report parameters. The server device(s) generate a report package that includes the one or more reports and sends the report package to the client device 102 via the network 114. Upon receiving the report package, the client device 102 displays the one or more reports in a graphical user interface. As will be described below in detail, the client device 102 can detect user interactions with various display elements and selectable graphical elements within the graphical user interface, and in response, the client device can present additional reports, a chronological animation of reports, and/or other information included within the report package.

Figure 2:
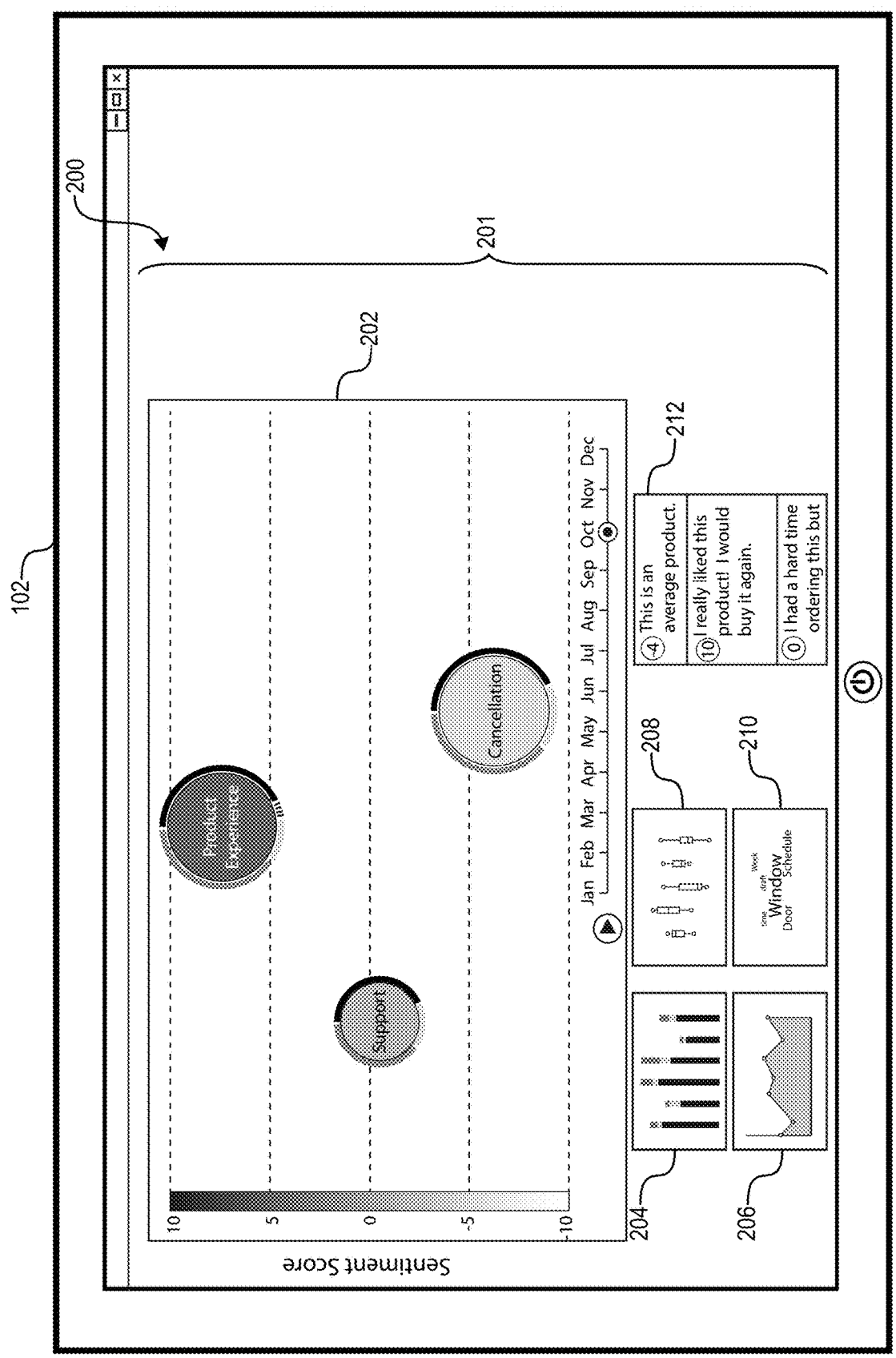
FIG. 2 illustrates a report graphical user interface in accordance with one or more embodiments.

FIG. 2 shows an example of a graphical user interface 200 on a monitor or display screen of the client device 102. More specifically, FIG. 2 illustrates a graphical user interface 200 including a report interface area 201 that includes multiple report areas 202-212. As used herein, the term "report interface area" refers to a visual area in a graphical user interface for displaying data reports. To illustrate, a report interface area can include multidata display elements, active display elements, activatable display elements, a timeline, and a timeline activation button.

As will be described in greater detail below, the report interface area 201 includes one or more reports (e.g., within report areas 202-212) that visualize various types of data related to various data categories (e.g., topics). Accordingly, the report interface area 201 allows a user 106 to interact with different reports and easily navigate between different types of reports visualizing different types of data. For example, report areas 202-208 show various examples of charts or other graphical visualizations, report area 210 shows a textual visualization of data, while report area 212 illustrates representative units of raw data alongside a sentiment score for the raw data.

A user can interact with report areas 202-212 to customize the report area layout (e.g., the location and position of report areas 202-212 within the report interface area 201. For example, the system 100 can generate and select which reports to provide within the report areas 202-212 based on default system settings, customized user settings, or based on learning user's interests by monitoring user interactions with the graphical user interface 200. For example, the system 100 can detect when the user 106 shows interest in a specific data type and data topic, and in response, the system 100 can generate a report visualizing data related to the user's interest within a report area. Furthermore, in some embodiments, the report system can automatically select a report to provide within one or more report areas based on detecting a reportable event within data. For instance, the system 100 can detect a reportable event based on determining significant change in a specific data topic, detecting data outside a predefined range, detecting a trending topic, or otherwise determine an anomaly within data. Based on detecting a reportable event within the data, the system 100 can provide a data visualization within a report area.

A user can interact (e.g., select with a mouse or provide a touch gesture) with a report area within the report interface area 201 to cause the system 100 to provide the report within the selected report area in more detail. For example, FIGS. 3A-3D show example details of a report from report area 202 shown in the report interface area 201 of FIG. 2. In general, FIGS. 3A-3D illustrate an example report in a topic view that includes several multidata display elements that each visualize different types of data within corresponding data categories. In addition, and as will be described below, FIGS. 3A-3D illustrate how the system 100 can generate and provide reports from various time periods to provide presentations of reports from various time periods with minimal user interaction. While FIGS. 3A-3D illustrate an example report interface area 202 according to one embodiment, other embodiments may omit or add display elements, buttons, or other elements shown in FIGS. 3A-3D based on the type and category of the underlying data.

Figure 3A:
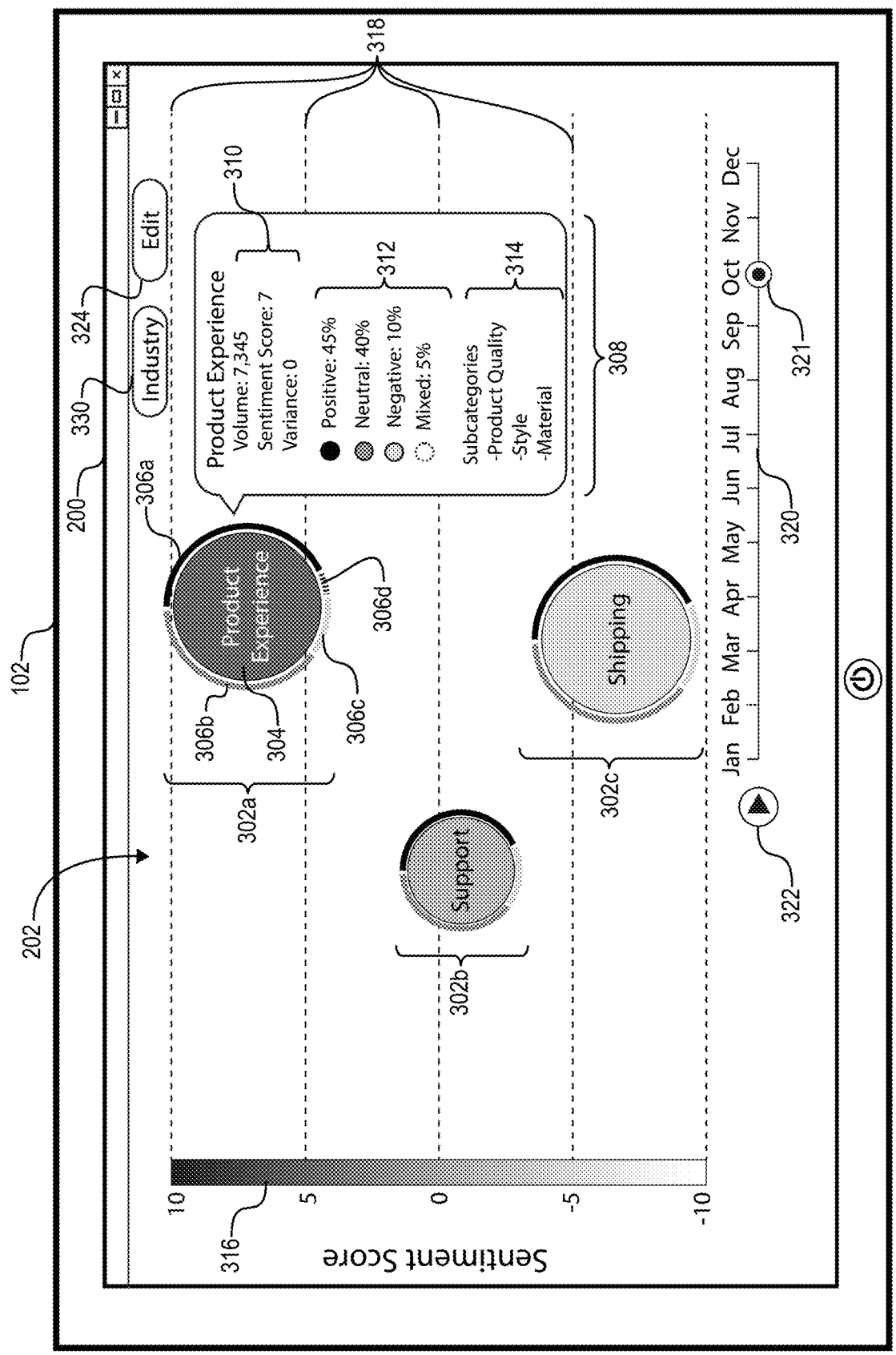
FIGS. 3A-3D illustrate a computing device presenting representative report interfaces in graphical user interfaces in accordance with one or more embodiments.

As mentioned, the report area 202 may include a multi-data display element. For example, FIGS. 3A-3D shows a topic view and illustrates multidata display elements 302a-c for topics. As shown in FIG. 3A, each multidata display element 302a-c corresponds to a data topic and includes visualization portions and display characteristics to represent different data types and data characteristics. For example, the multidata display elements 302a-c are directed to three survey response data categories: multidata display element 302a corresponds to the data topic of "Product Experience," multidata display element 302b corresponds to the data topic of "Support," and multidata display element 302c corresponds to the data topic of "Shipping." Accordingly, the different visualization portions, display characteristics of the visualization portions, and locations of each multidata display element 302a-c provide multiple simultaneous visualizations of types of data within each topic.

As a general overview of example visualization portions and display characteristics that a multidata display element includes to efficiently visualize data, reference is made to multidata display elements 302a-c, which visualize various facets of customer sentiment for each data topic based on electronic survey response data. For example, and as shown in FIGS. 3A-3D, a multidata display element can include active display elements and activatable display elements. As used herein, the term "active display element" refers to a permanently visualized display element within the multidata display element. For example, multidata display element 302a includes a central active display element 304 surrounded by outer active display elements 306a-d that form a circular bar graph around the central active display element. Additional characteristics and functions of active display elements will be discussed in further detail below.

In addition to active display elements, FIGS. 3A-3D illustrate that multidata display element 302a includes an activatable display element 308 in an activated state. The term "activatable display element" refers to a display element that is not permanently visualized within the multidata display element, but rather, is activated and presented in response to a user interaction with the multidata display element. For example, an activatable display element can include a pop-up display element that appears in response to detecting a mouse hover over a multidata display element. As discussed in more detail below, an activatable display element can include textual or graphical data that provides detail corresponding to active display elements and/or additional data not displayed in active display elements.

As mentioned, FIG. 3A shows the activatable display element 308 in an activated state, for example, based on the system 100 detecting a user interacting with the multidata display element 302a. In response to detecting that the user terminates the interaction, the system 100 would cease to present the activatable display element 308 to reduce clutter within the graphical user interface 200 when the user is not in need of the additional detail and data within the activatable display element. Activatable display elements will be discussed in further detail below.

As generally discussed above, the multidata display element 302a includes a central active display element 304. As shown in FIG. 3A, the central active display element 304 includes various characteristics used to visualize data or data properties. For example, central active display element 304 is a shaded circle, and the report management system 100 generates its size based on the volume of responses related to its corresponding topic. FIG. 3A shows that the size of multidata display element 302a is based on the size of central active display element 304. The relative sizes of multidata display elements 302a-c visualize that the topic "Product Experience" was included in a greater number of responses than "Support," but in a smaller number of responses than "Shipping." This visualization allows a user 106 to quickly understand the volume of responses for each of the categories of data. It will be appreciated that while example central active display element 304 uses size to visualize volume of responses, the size of a central active display element 304 could visualize any one of various types of data. For example, the size of central active display element 304 could represent a percentage of responses related to a topic, an average amount of time taken to complete tasks related to a topic, a number of respondents who interacted with the topic in a graphical user interface, or any of a multiplicity of data types.

In addition to the size of the central active display element 304, the color or shading of the central active display element 304 can be used to visualize aspects of data related to the data topic corresponding to the multidata display element 302a. For example, and as shown in FIG. 3A, the shading of the central active display element 304 indicates an overall sentiment score of customer survey responses related to "Product Experience." In FIG. 3A, the shading of the multidata display elements 302a-c visualize that the topic "Product Experience" has a higher sentiment score than "Support," which in turn has a higher sentiment score than "Shipping." This visualization allows a user 106 to quickly and accurately understand the sentiment score associated with responses for each of the categories of data. It will be appreciated that while example central active display element 304 uses shading and/or color to visualize volume of responses, the color or shading of a central active display element 304 could visualize any one of various types of data. For example, the color of central active display element 304 could represent an urgency score, variance, a length of responses, or any of a multiplicity of data types.

As discussed above, in addition to the central active display element 304, the multidata display element 302a includes outer active display elements 306a-d. As shown in FIG. 3A, the system 100 creates the outer active display elements 306a-d to form a circular bar graph based on the sentiment breakdown of responses relating to a corresponding data topic. For example, FIG. 3A illustrates that outer active display element 306a visualizes the percentage of responses relating to "Product Experience" that expressed positive sentiment regarding "Product Experience," outer active display element 306b visualizes the percentage of responses relating to "Product Experience" that expressed neutral sentiment regarding "Product Experience," outer active display element 306c visualizes the percentage of responses relating to "Product Experience" that expressed negative sentiment regarding "Product Experience," and outer active display element 306d visualizes the percentage of responses relating to "Product Experience" that expressed mixed sentiment regarding "Product Experience." However, it will be appreciated that outer active display element 306a-d need not make up a circular bar graph but could be a variety of visual representations of data suited to a given multidata display element. For example, if central active display element 304 were another shape, the bar graph making up outer active display element 306 could take the shape of the perimeter of the central active display element 304. In another embodiment, outer active display elements 306a-d could show a collection of colored dots surrounding the central active display element 304 representing data points for each response.

Additionally, the outer active display element 306a-d may use color or shading to visualize data. For example, as in FIG. 3A, each outer active display element 306a-d has a shading that corresponds to a sentiment type. As shown in FIG. 3A, outer active display element 306a is black and represents a percentage of responses relating to "Product Experience" that have positive sentiment, while outer active display element 306b is dark gray and represents a percentage of responses relating to "Product Experience" that have neutral sentiment, outer active display element 306c is light gray and represents a percentage of responses relating to "Product Experience" that have negative sentiment, and outer active display element 306d is dashed and represents a percentage of responses relating to "Product Experience" that have mixed sentiment. However, the outer active display element 306a-d need not use shading to visualize data. In another embodiment, the graph could display sentiment using color (e.g. green for positive sentiment, red for negative sentiment, yellow for mixed sentiment, and white for neutral sentiment). Additionally, the outer active display elements 306a-d need not visualize response sentiment. Outer active display elements could show a breakdown of user engagement, a breakdown of respondent demographics, a breakdown of a responses to a particular question, or a multiplicity of data types that correspond to a give data topic.

As briefly mentioned above, the outer active display elements 306a-d utilize the length of each of its bar segments to represent a segment of data from the dataset. In FIG. 3A, for example, the length of each bar segment on outer active display element 306a-d shows the percentage of responses related to the various sentiment types of "Product Experience," as discussed above. In FIG. 3A, the width of each of the bars of the outer active display element 306a-d are uniform and do not necessarily represent a data attribute. However, in another embodiment the width of the bars can represent another type of data or data attribute. For example, when the length of each of the bars of the outer active display element 306a-d represent the breakdown of sentiment for responses related to "Product Experience," the width of the bars can indicate a strength of the sentiment score such that the system 100 can efficiently visualize a proportion of responses related to a particular sentiment, but also the strength or degree of those sentiments.

Figure 3B:
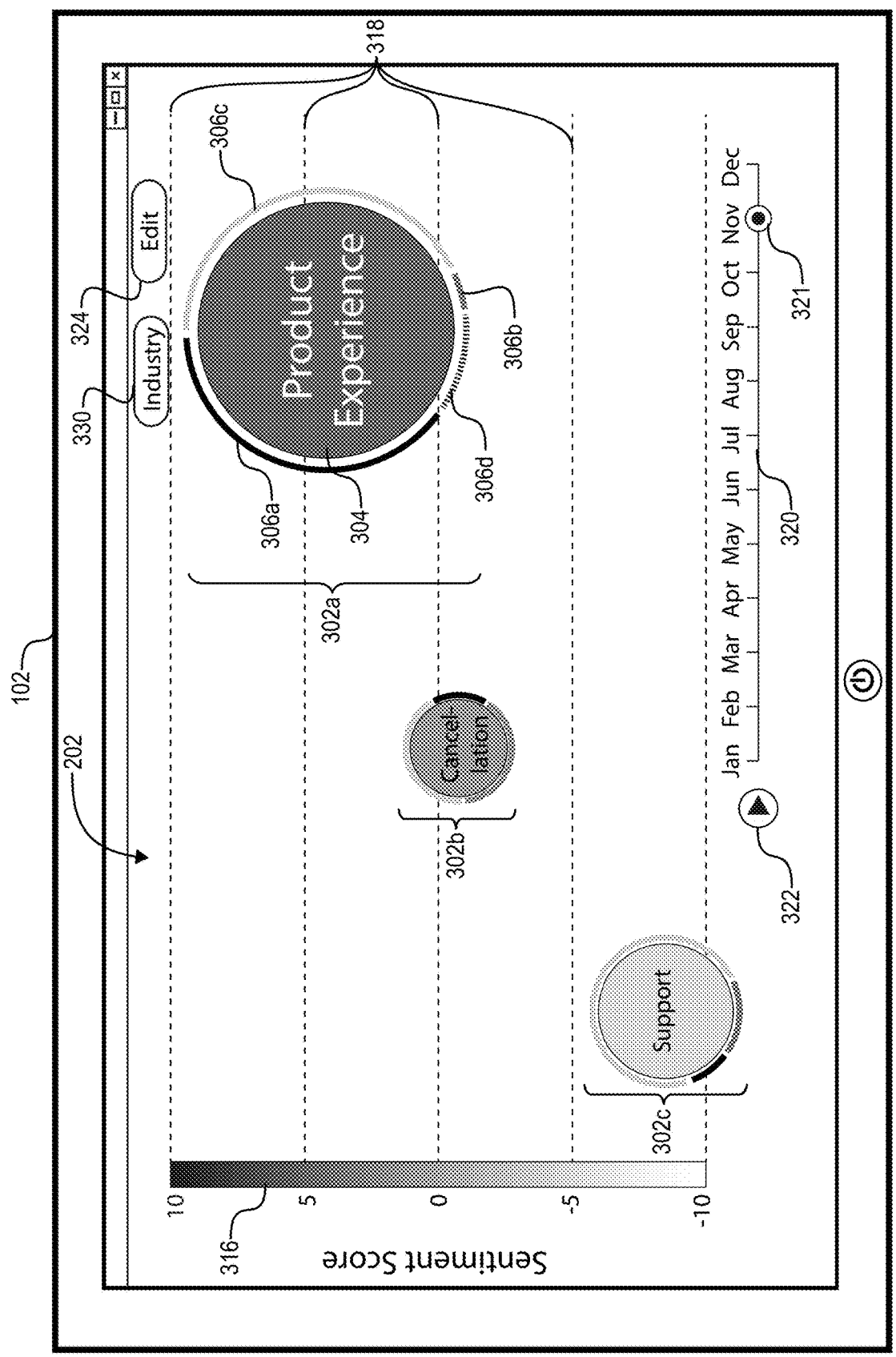
Figure 3C:
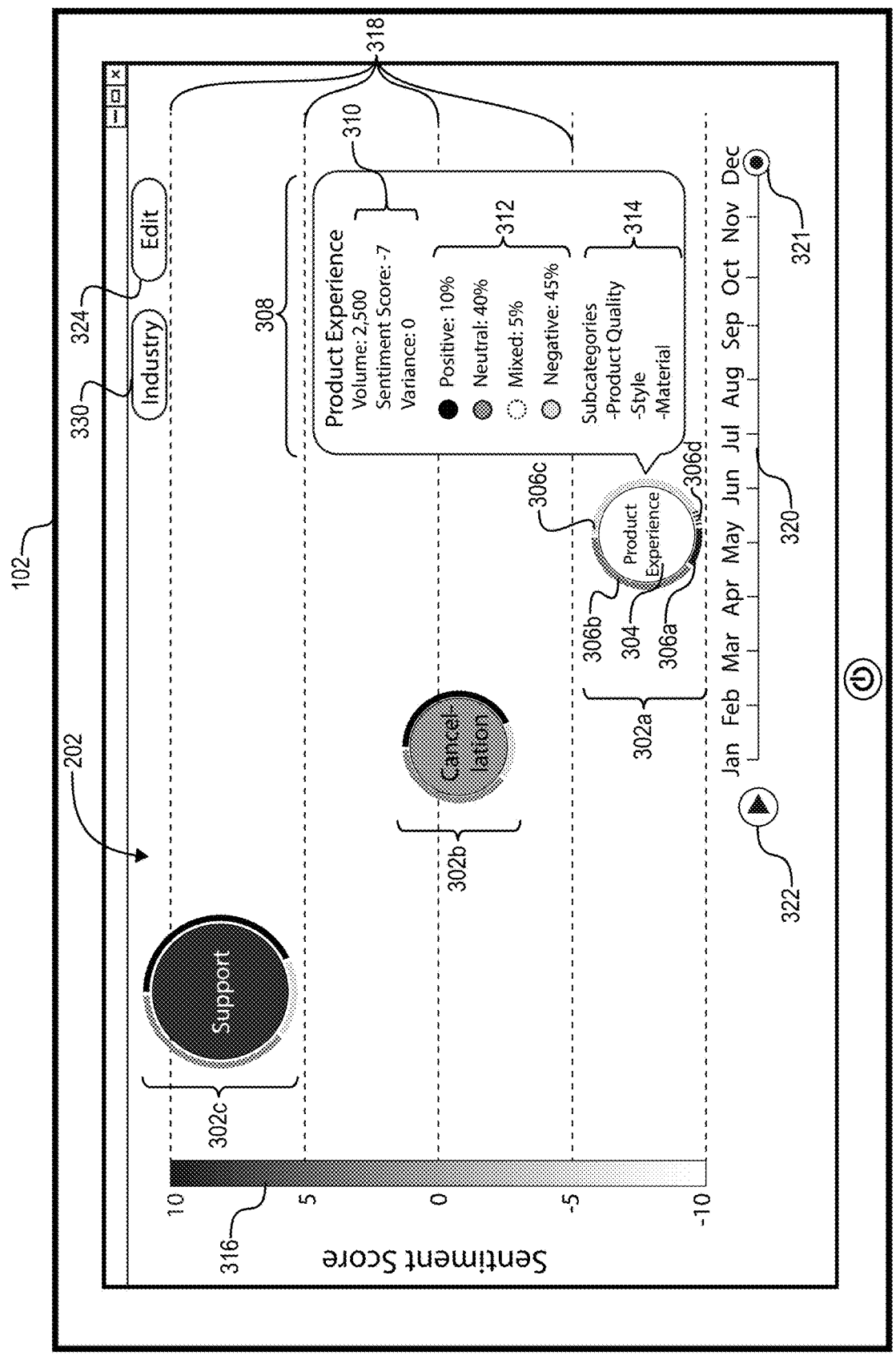

As discussed briefly above, in addition to active display elements, the report interface area 202 may also include an activatable display element. For example, FIGS. 3A and 3C illustrate an example an activatable display element 308 that system 100 has activated for presentation within the report interface 202. Though activatable display element 308 corresponds to multidata display element 302, it will be appreciated that any multidata display element may have a corresponding activatable display element, even if they are not illustrated in FIGS. 3A-3D.

In one or more embodiments, the system 100 activates the activatable display element 308 in response to detecting a user interaction with the multidata display element 302. The system 100 can activate the activatable display element 308 by various types of user interactions on various types of client devices. For example, the system 100 may activate the activatable display element 308 in response to detecting the user hovering a mouse over the multidata display element 302 or double-clicking the multidata display element 302. In another embodiment on a touch screen such as a tablet, mobile phone, or other handheld device, the system 100 can render the activatable display element 308 in response to the user swiping over or double tapping the multidata display element 302.

In one or more embodiments, as shown in FIG. 3A, the system 100 activates the activatable display element 308 by providing a pop-up window including various detail portions. As used herein, the term "detail portion" refers to a display area including visual or textual data displays. In particular, the term "detail portion" can include various representations of data, including an explanation of data. To illustrate, a detail portion can include numerical breakdowns of data, graphical representations of data, and textual explanations of data. For example, in some embodiments, the system 100 can divide the activatable display element 308 into detail portions 310-314, as shown in FIG. 3A. In addition or alternatively, the report management system may visualize the activatable display element 308 inside of the central active display element 304, or at a designated data panel or other location within the report interface area 202.

The detail portions 310-314 may include various types of data related to a corresponding data topic. For example, as shown in FIG. 3A, detail portion 310 includes numerical data corresponding to central active display element 304, e.g., the volume of responses and the overall sentiment score for the responses. In addition, detail portion 310 includes additional data not represented in an active display element, e.g., variance. As further shown in FIG. 3A, the system 100 provides detail portion 312 that includes a numerical breakdown for outer active display elements 306a-d. This breakdown can help a user to quickly view precise quantitative data matching the visual representations of data from the outer display elements 306a-d.

In addition to detail portions 310 and 312, and as also shown in FIG. 3A, the system 100 provides detail portion 314 that includes subcategories corresponding to the multidata display element's 302a topic, which are not included in any active display element. Thus, it will be appreciated that detail portions may include additional detail regarding data visualized in active display elements, data not visualized in any active display element, or both. Again, detail portion 314 need not be a listing of subcategories but could be any one of a variety of data representations. Additionally, though activatable display element 308 includes 3 detail portions, in other embodiments the activatable display element 308 can include any number of detail portions.

In addition to providing data visualization within the activatable display element 308, the system 100 provides additional data visualization based on positioning the multidata display element 302a at a designated location within the report interface area 202. For example, the location of the multidata display elements 302a-c with respect to the y-axis (e.g., data axis 316) and with respect to the other multidata display elements may also be used to visualize aspects of data related to the data topic corresponding to the multidata display element 302a. For example, in FIG. 3A, the system 100 determines the location of the multidata display element 302a based on the overall sentiment score associated with the data topic corresponding to the multidata display element 302a. Additionally, though the location of multidata display elements 302a-c indicate sentiment score in example report area 202, it will be appreciated that other embodiments may utilize location to visualize any one of various types of data. For example, the location of multidata display elements 302a-c could represent a deviation from the average number of responses, a number of users indicating the topic as important to them, a proportion of growth over a prior time period, or any of a multiplicity of data types.

As further shown in FIG. 3A, the system 100 determines the location of the multidata display elements 302a-c to visualize that the topic "Product Experience" has a higher sentiment score than "Support," which has a higher sentiment score than "Shipping." This visualization allows a user 106 to quickly understand the sentiment score of responses for each of the data topics. Moreover, and as mentioned above, to facilitate user interpretation of the meaning of the location of the multidata display elements 302a-c, the report interface area may also include data axis 316. For example, FIGS. 3A-3D illustrate that the system 100 provides data axis 316 as a shaded gradient along a y-axis including numerical values corresponding to sentiment score.

In example report interface area 202, the system 100 does not provide a data axis along the x-axis, and the system 100 can position multidata display elements within the report interface area without regard to the location with respect to the x-axis. By not defining the position of a multidata display element with respect to the x-axis, the system 100 can accommodate the positioning of many multidata display elements because the system 100 can generate the position of the multidata display elements to overlap with respect to the x-axis to fit as many multidata display elements within the report interface area 202 as needed. In other words, because the system 100 does not position multidata display elements based on data that corresponds to the x-axis, the system 100 generates a flexible customized position of each multidata display element to efficiently show multiple multidata display elements. However, it will be appreciated that some embodiments may include a data axis along both the y-axis and the x-axis, or along the x-axis alone.

As FIGS. 3A-3D further illustrate, the report interface area 202 may also include a timeline to enable navigation among multiple time periods for a report. As used herein, the term "timeline" refers to a visual display of time intervals. In particular, the term "timeline" can include a visual display of multiple time intervals connected by a horizontal line, where each of the time intervals are selectable via user input. To illustrate, a timeline can include various selectable time intervals and in response to the system 100 detecting a selection of a time interval on the timeline, the system 100 can provide a report (e.g., one or more multidata display elements) corresponding to the selected time interval. For example, FIGS. 3A-3D illustrate an example timeline 320, a horizontal line at the bottom of the report interface area 202 with timeline marks corresponding to various time intervals. Though FIGS. 3A-3D show the timeline 320 horizontally at the bottom of the report interface area 202, the timeline could be included at the top of the report interface area 202, or vertically on the left or right side of the report interface area 202.

Moreover, the timeline may visually indicate which time interval the currently displayed report represents. For example, the timeline may also include a time interval indicator 321. The system 100 positions the time interval indicator 321 along the timeline 320 in response to user selection of timeline marks or time frames along the timeline 320. The system 100 provides the time interval indicator 321 to indicate the time frame associated with the data the system 100 is currently providing in the report interface area 202.

The timeline marks on timeline 320 divide the timeline into time intervals that correspond to data reports for those time intervals. For example, in FIGS. 3A-3D, the system divides the timeline 320 in to one-month time intervals. However, the system 100 can divide the timeline 320 into any time intervals used to generate reports. For example, the time intervals could be weekly, biweekly, bimonthly, quarterly, yearly, or any other time interval. The time intervals need not be regular time intervals but could be irregular intervals. The system 100 can calculate or determine the time intervals, or alternatively, the system 100 can receive user input that defines the time intervals.

The system 100 generates and visualizes many different reports for various time intervals, and the system 100 provides the various reports in the report interface area 202 based on user selection of timeline marks or time frames along the timeline 320 or automatically in response to reporting features discussed in greater detail below. For example, in FIG. 3A, the report interface area 202 includes a report corresponding to October, while in FIG. 3B, the report interface area 202 includes a report corresponding to November, and in FIG. 3C, the report interface area 202 includes a report corresponding to December. In each of FIGS. 3A-3D, the system 100 includes the time interval indicator 321 along the timeline 320 at the time interval corresponding to the report the system 100 currently is providing within the report interface area 202.

As mentioned above, the system 100 can cause the time interval indicator 321 to move along the timeline 320 and provide corresponding data reports that transition from one time interval to the next as the time interval indicator 312 moves along the timeline. This system 100 can provide this transitioning report feature in response to detecting user input with a timeline activation button 322, as illustrated in FIGS. 3A-3D. As used herein, the term "timeline activation button" refers to a user-interactable element that, in response to user input, causes the system 100 to visualize reports in succession over the timeline. In particular, the term "timeline activation button" can include a user interactable element that, based on detecting a user interaction, causes the report management system to display reports in succession over the timeline with connecting animations to create seamless transitions from one interval to the next. For example, FIGS. 3A-3D show timeline activation button 322 resembles a "play" button (i.e. a round button containing a triangle). However, the timeline activation button 322 could be displayed as a variety of user-interactable displays. For example, the timeline activation could be a button of any of a variety of shapes and could contain symbols or words such as "Play" or "Activate."

The system 100 can detect user input with respect to the timeline activation button 322. In response to detecting a user interaction with the timeline activation button 322, the system 100 may move the time interval indicator 321 along the timeline and, in conjunction with this movement, include data reports in the report interface area sequentially. In other words, in response to user interaction with the timeline activation button 322, the system 100 may automatically and sequentially visualize data reports corresponding to time intervals displayed on the timeline 320. Thus, the user 106 can easily discern trends in the reports by watching the multidata display elements and activatable display elements change over time.

After the system 100 detects user interaction at the timeline activation button 322, the button may enter an "active" state, and the button may change its appearance accordingly. For example, the timeline activation button 322 may change from a "play" symbol to a "pause" symbol. In another embodiment, the system 100 may show the timeline activation button 322 with a different color or shading to indicate that it is activated or may change its design in a variety of ways. Moreover, the reports may be displayed in succession for an amount of time designated for each report. This amount of time may be determined by the system 100 or may be set by the user 106. Each report may each be given equal time, or the reports may be given different time based on the changes to data and the type of data included in each report or based on user settings. For example, the report interface area may include each report for 10 seconds before transitioning to the next report, or the report interface area may include some reports for 10 seconds and some reports for 20 seconds based on user settings.

The transitions between the reports may be accompanied by transitional animations to create a seamless data reporting experience that makes it even easier for users to accurately discern trends in data. For example, after detecting user interaction with the timeline activation button 322, the system 100 may display multidata display element 302 as shown in FIG. 3A, then it may display a transitional animation that shows central active display element 304 growing larger and outer active display element 306a-d shifting the bars in its graph to transition to display the multidata display element 302 in the November report, as shown in FIG. 3B. Accordingly, the system provides multiple changing visualizations associated with the multidata display element 302 to efficiently and accurately changes to product experience between October and November with just a single user interaction. To illustrate further, the report management system may further display a transitional animation showing the multidata display element 302 moving down on the y-axis, the outer active display element 304 growing smaller and becoming lighter, and active display element 306a-d shifting the bars in its graph to transition to display the multidata display element 302 in the December report, as shown in FIG. 3C.

In response to user interaction at the timeline activation button 322 while the timeline activation button 322 is active, the system 100 may "pause" or stop playing the reports in order with transitional animations. This allows the user 106 to spend additional time viewing a report that the user 106 found interesting while the timeline activation button 322 was activated. The system 100 may resume playing the reports in order with transitional animations from the presently displayed report upon receiving additional user interaction at the timeline activation button 322.

Additionally, if the report management system 100 detects the appropriate user interaction with the multidata display element 302 during timeline activation, the system 100 may continue to display the activatable display element 308 during the timeline activation, including during the transition animations. The system 100 may also display transition animations if feasible for the display features of the activatable display element 308. With regard to numerical or verbal detail portions on the activatable display element 308, the activatable display element may, with the transitional animation gradually change the numerical data to match the current state of the transitional animation until arriving at the values for the next data report.

In addition to these timeline features, the report interface area 202 may also include an edit button. For example, FIGS. 3A-3D illustrate an example edit button 324. As will be further explained in FIGS. 5A-5C, the report management system 100 may provide an editing interface in which a user may modify report parameters, including adding multidata display elements corresponding to new categories or subcategories. In response to detecting user interaction with the edit button 324, the report management system 100 may open the editing interface.

Figure 3D:
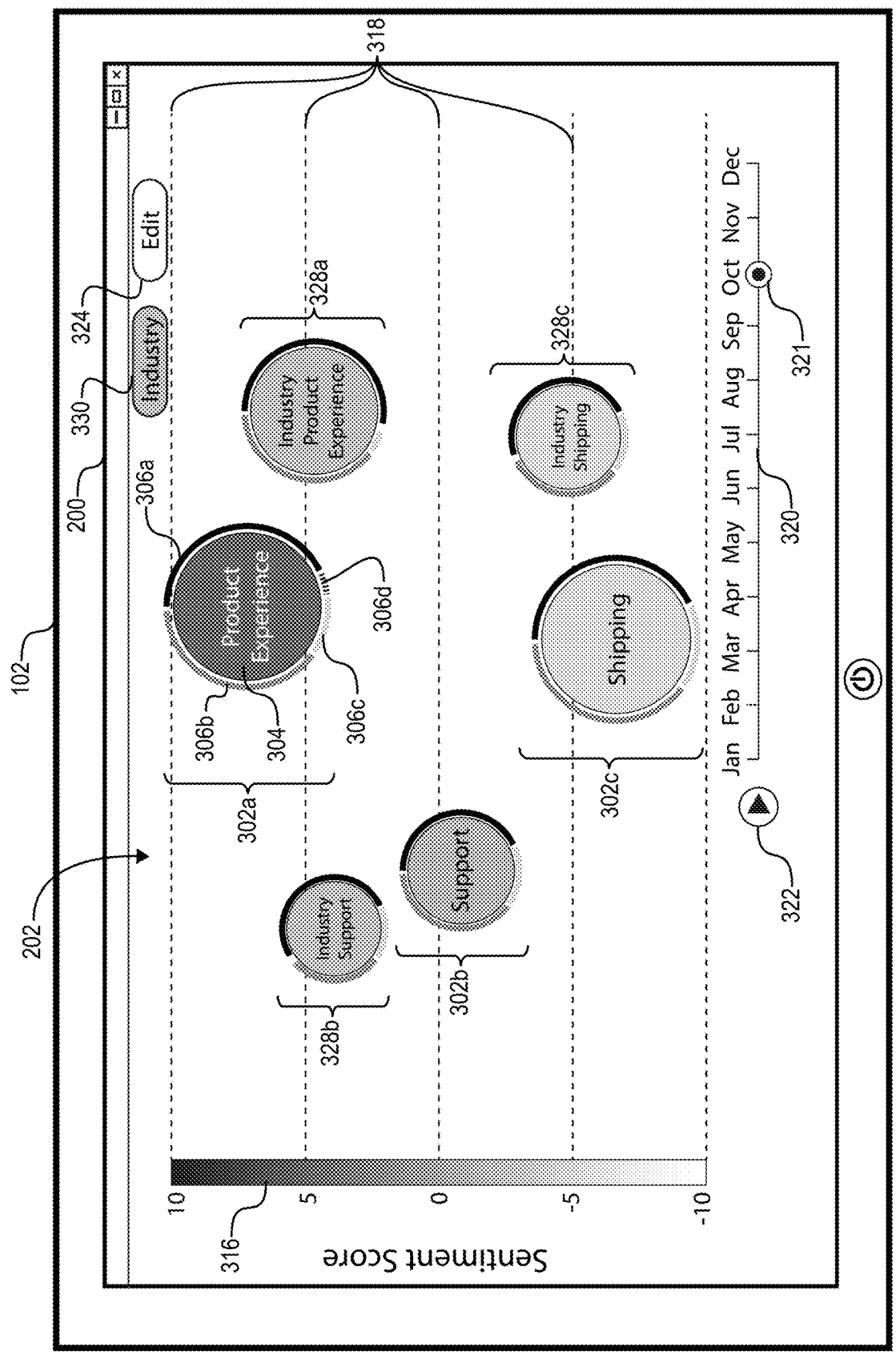

Additionally, the report interface area 202 may include an industry button. For example, FIGS. 3A-3D illustrate an example industry button 330. In response to detecting a user interaction with the industry button 330, the system 100 may include an industry view in the report interface area 202, as shown in FIG. 3D. Though FIG. 3D shows an industry view related to a topic view, the system 100 may also show an industry view related to the subtopic view discussed below with regard to FIGS. 3A-3C. As shown in FIG. 3D, the industry view includes industry multidata display elements 328a-c, with corresponding topics to multidata display elements 302a-c. These industry multidata display elements correspond to a dataset collected across an industry (e.g., based on benchmark data). The industry view allows the system to provide a user interface within a single selection of a button to allow a user to compare broad industry data corresponding to the topics included in the report interface area 202 with data from the dataset corresponding to those same topics. This allows the user 106 to quickly and easily determine how their dataset compares to an industry standard.

The industry multidata display elements 328a-c may include all of the functionality of multidata display elements 302a-c. For example, industry multidata display elements 328a-c may include an activatable display element 308 in response to user interaction and may show changes over time in response to user interaction with the timeline activation button 322. The industry multidata display elements 328a-c may include the same types of data with the same types of display elements as multidata display elements 302a-c in order to facilitate easy comparison between the industry multidata display elements 328a-c and the multidata display elements 302a-c.

Figure 4A:
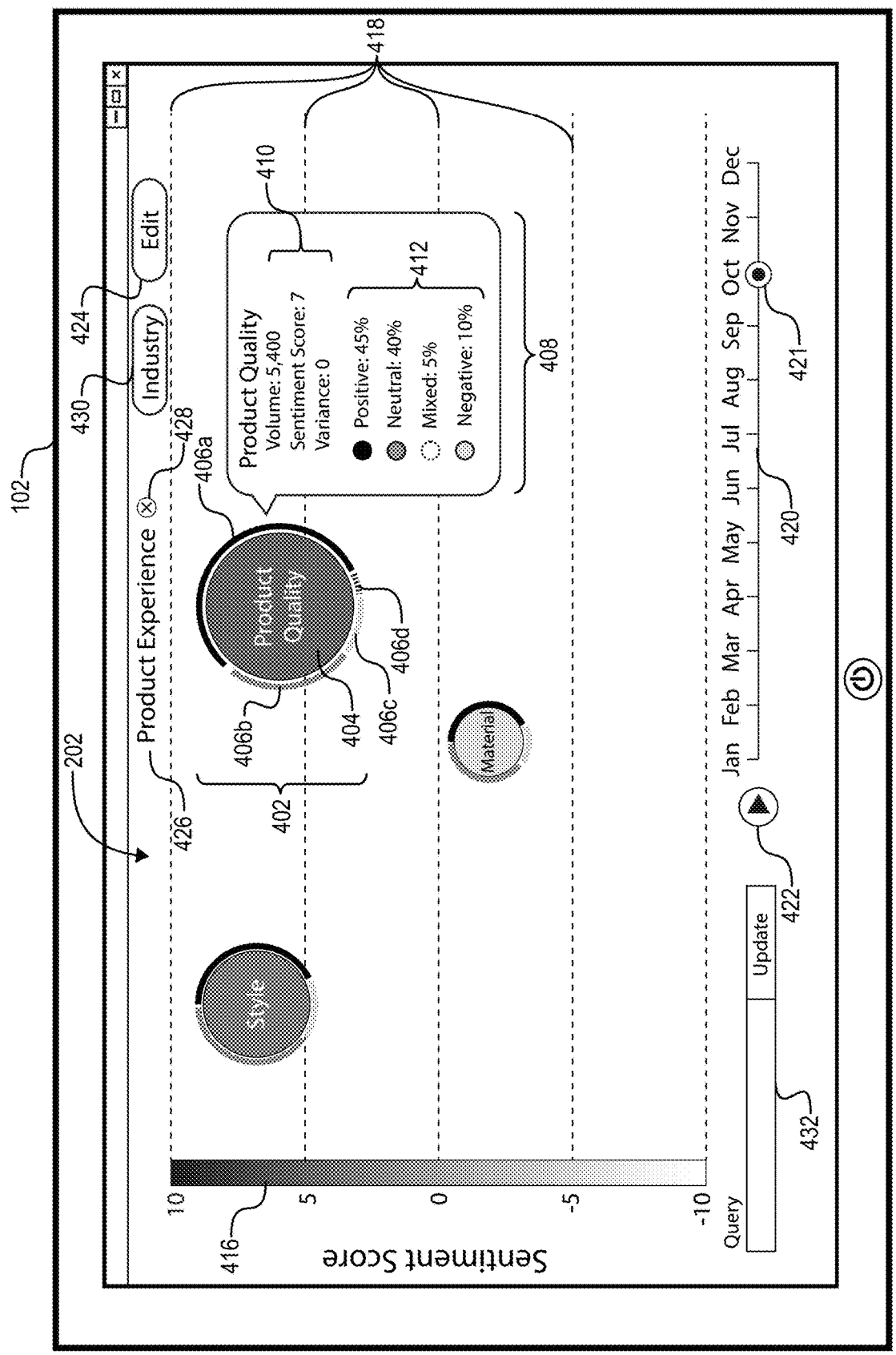
FIGS. 4A-4C illustrate a computing device presenting representative report interfaces in graphical user interfaces in accordance with one or more embodiments.

In addition to the topic view and industry view shown in FIGS. 3A-3D, FIGS. 4A-4C illustrate a subtopic view. Just as the system 100 may generate reports for topics, the system 100 may generate reports for subtopics. As used herein, the term "subtopic" refers to a topic of data that contributes to a larger category of data (i.e. a topic). This subtopic may be in a hierarchy of topics beneath one or more topic "layers." For example, FIG. 4A shows the subtopics "Product Quality," "Style," and "Material" under the topic heading "Product Experience." Additional characteristics and functions of subtopics will be discussed in further detail below.

In response detecting a user interaction with multidata display element 302, the system 100 provides a subtopic view corresponding to multidata display element's 302 topic within the report interface area 202. Thus, the system provides a series of reports within the report interface area that "drill down" on topics to provide additional detail and visualizations regarding the topic in a subtopic view while minimizing the number of steps and interactions the user has to take to obtain the data from the system. Additionally, it will be appreciated that while the subtopic view shown in FIGS. 4A-4C corresponds to a topic shown in FIGS. 3A-3D, in some embodiments a subtopic view may correspond to a subtopic itself. That is, in some embodiments, the system can provide several layers of subtopics to provide reports "drilling down" on a subtopic to see additional subtopics.

The topic view and subtopic view are very similar except that the topic view includes multidata display elements for topics, and the subtopic view includes sub-multidata display elements for sub-topics. As described above, the system 100 can provide the particular design of the various report components 302-324 shown in FIG. 3A-3D in various ways. Similarly, it will be appreciated that the system 100 can provide report components 402-424 for the subtopic view shown in FIGS. 4A-4C using any of a variety of designs as described above with regard to FIGS. 3A-3D.

Figure 4B:
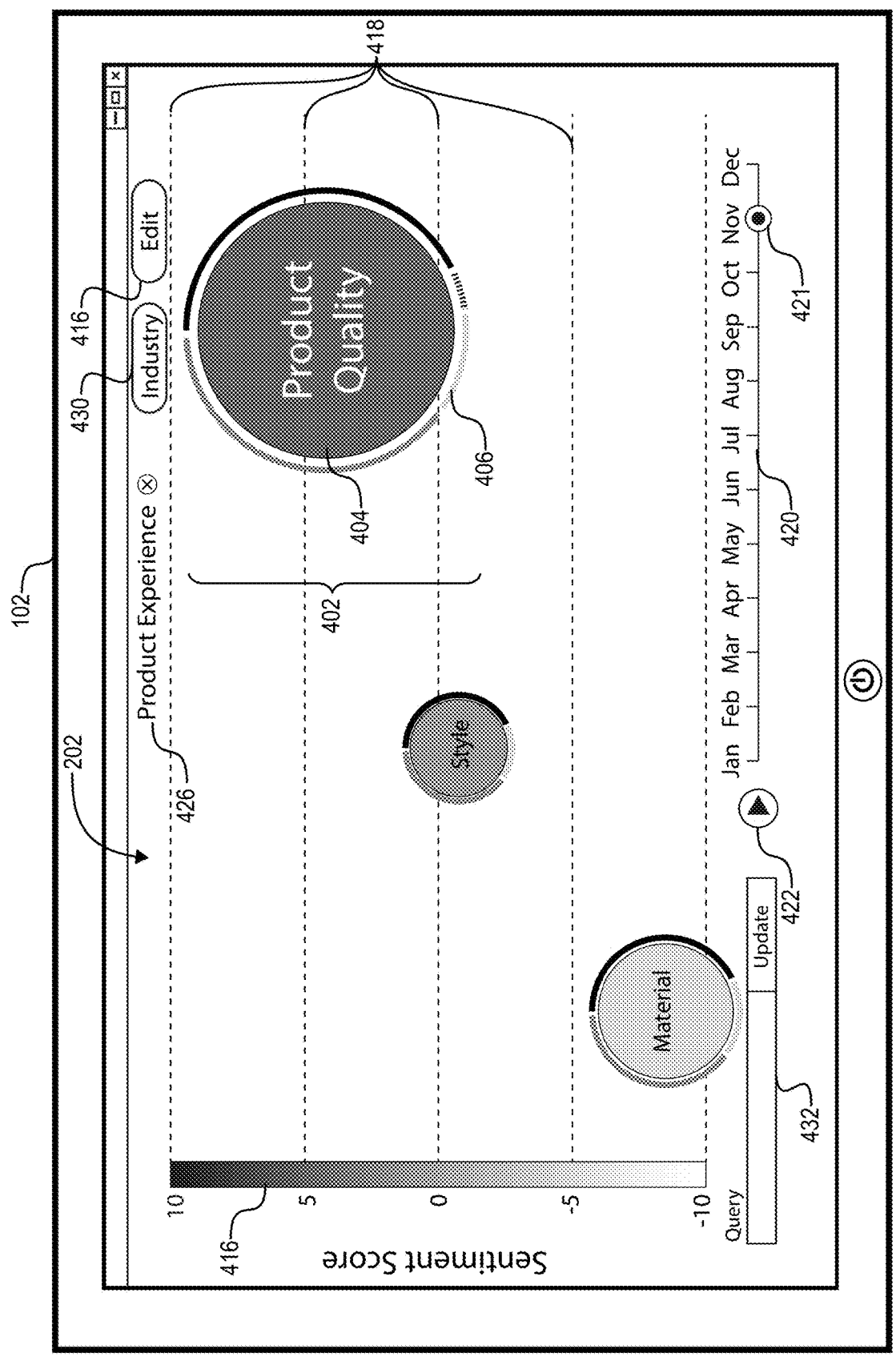
Figure 4C:
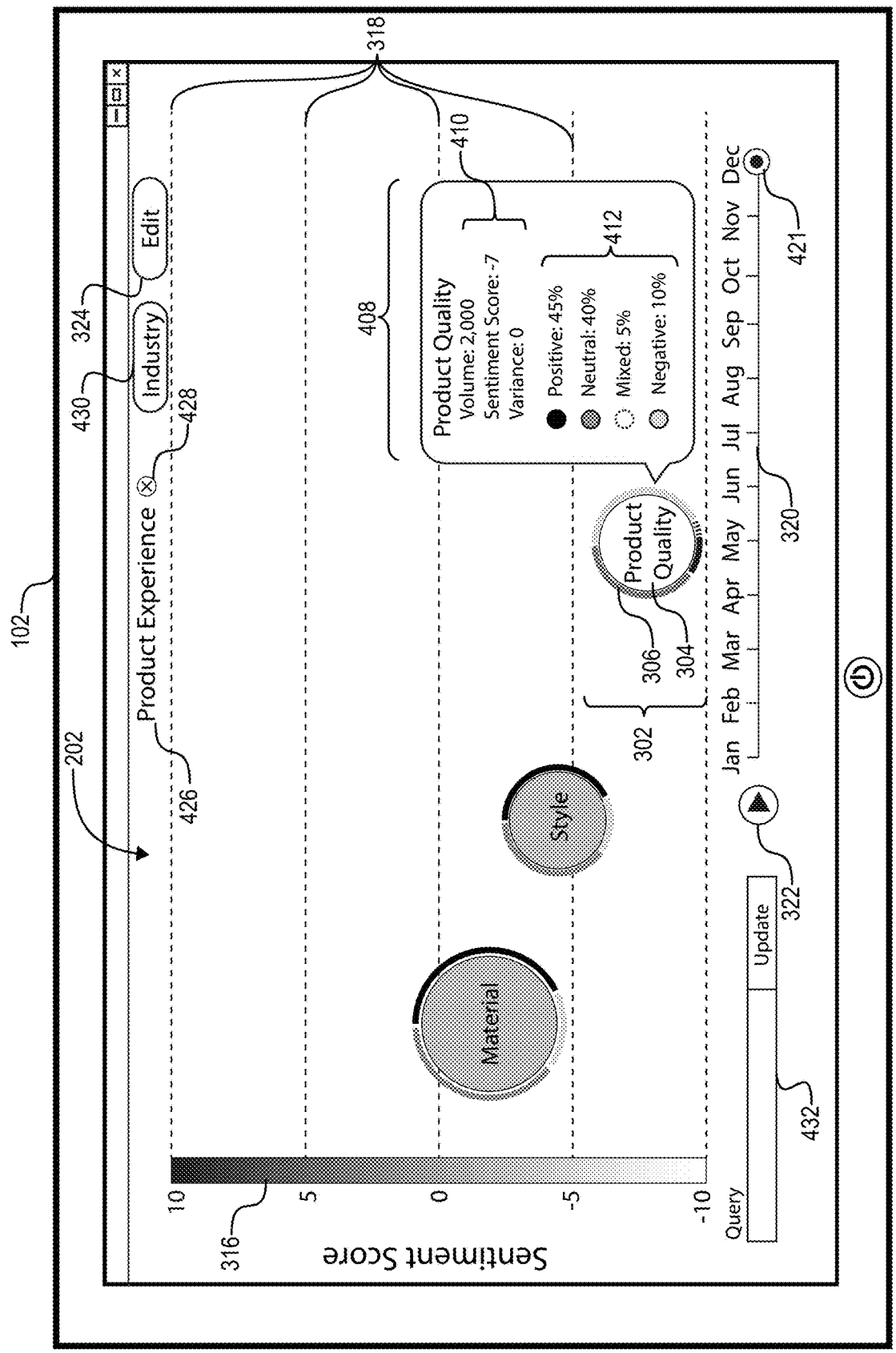

The subtopic view shown in FIGS. 4A-4C further enables the user 106 to easily and quickly view and analyze a dataset. The subtopic view allows a user to view data contributing to a larger topic to ascertain factors contributing to larger patterns in a dataset. For example, the user 106 may observe that, as shown in FIG. 3A, "Product Experience" has a very positive sentiment score in October and may want to see what subtopics are contributing to that positive score. The user could interact with the multidata display element 302, and in response the system would cause the "Product Experience" subtopic view to be included in report interface area 202. The user could then observe, as shown in FIG. 3A, that in October "Product Quality" had a large volume of positive responses, "Style" had a smaller quantity of responses with an aggregate slightly positive sentiment score, and "Material" had a low volume of responses with a low sentiment score.

As discussed above, FIGS. 4A-4C shows a subtopic view with sub-multidata display elements. As used herein, the term "sub-multidata display element" refers to a multidata display element, as defined above, corresponding to a subtopic in a subtopic view. That is, the function of the sub-multidata display element 402 is the same in most respects as the function of the multidata display element 302. The differences will be discussed in greater detail below.

Sub-multidata display element 402, as shown FIGS. 4A-4C, shows the multidata display element 402 in the same format as multidata display element 302. As mentioned above in greater detail, the multidata display element 302 need not adhere to the same design as shown in FIGS. 3A-3D. Similarly, the sub-multidata display element 302 need not adhere to the design shown in FIGS. 4A-4C. Additionally, while FIGS. 3A-3D and FIGS. 4A-4C show multidata display element 302 and sub-multidata display element 402 in the same design, the topic view and the subtopic view need not include multidata display element multidata display element 302 and sub-multidata display element 402 in the same design, but can include a multidata display element 302 of one design and a sub-multidata display element 402 of a different designs, such as one of the various multidata display element configurations discussed above.

The sub-multidata display element 402 is also similar to the multidata display element 302 because it includes with central active display element 404 and outer active display element 406, as shown in FIGS. 4A-4C. These active display elements function in the same manner described above with regard to central active display element 304 and outer active display element 306*a-d*. Additionally, sub-multidata display element 402 includes a corresponding activatable display element 408 with detail portions 410, 412. Similarly, the activatable display element 408 functions in the same or similar manner described above with regard to activatable display element 308.

The system can provide the subtopic view shown in FIGS. 4A-4C with the same or similar functions of the topic view described above with regard to FIGS. 3A-3D. That is, the subtopic view includes many of the same components of the topic view, namely a user interface area 202, a data axis 416, data axis indicators 418, a timeline 420, a time interval indicator 421, a timeline activation button 422, an edit button 424, and an industry button 430. As discussed above, these components function in the same way in a subtopic view as the data axis 316, data axis indicators 318, the timeline 320, the time interval indicator 321, the timeline activation button 322, the edit button 324, and the industry button 330 function in the topic view, as described above with regard to FIGS. 3A-3D.

However, unlike the topic view, the subtopic view includes a topic heading 426, as shown in FIGS. 4A-4C. The topic heading includes a title. This title indicates to the user that the report interface 202 currently includes a subtopic view and indicates the topic to which the subtopic view corresponds. For example, in FIGS. 4A-4C, the topic heading 426 indicates that the subtopic view corresponds to the topic "Product Experience." Thus, the user 106 may easily ascertain that "Product Quality," "Style," and "Material" are subtopics of the topic "Product Experience."

The system can provide a cancellation button 428 within the subtopic view. In FIGS. 4A-4C, the cancellation button is shown as a circle with an "X." When the system 100 detects an interaction with the cancellation button 428, the system causes the report interface area 202 to go back to the report that includes the topic, i.e., the report shown in FIG. 3A. Accordingly, the system provides navigational functionality to allow a user to navigate between the topic view and subtopic view efficiently and without having to provide numerous report details as with conventional system. Indeed, with just a few user interactions, a user can drill down on the data and return to the original report in a couple of interactions (e.g., two clicks).

Additionally, as shown by FIGS. 4A-4C, the subtopic view may also include a query bar 432. It will be appreciated that though FIGS. 4A-4C show the query bar 432 included in the subtopic view, and FIGS. 3A-3D do not show the query bar 432 included in the topic view, various embodiments may include a query bar 432 in either view, both views, or neither view. The system can detect a user interaction with the query bar 432 to search for raw data in the dataset. For example, the user 106 may input words into the query bar 432 via a keyboard, or voice-to-text. Additionally, the user 106 may input topics or subtopics into the query bar 432 as search terms by user interaction with multidata display elements 402. For example, in response to receiving a double-click or double-tap at multidata display element 402 for "Product Quality," the system may add the search term "Product Quality" to the query bar. The user can further add additional query terms, such as "Style," "Material" or any other topic or subtopic as a search term in a similar manner, so that the user 102 may search with any number of search terms at once. The system may also add a search term in response to a variety of inputs, such as a swipe in a touch screen embodiment or a click-and-drag motion in an embodiment where the client device 102 is connected to a mouse or similar device.

In response to user interaction with the query bar 432, the system 100 may include search results including raw data from the data set corresponding to the search terms in the query bar 100 in the graphical user interface 200 below the report interface area 202 or may direct the client application 104 to a new page including the search results. Similar to the report area 212, the search results may display raw data alongside a sentiment score for that data.

Figure 5A:
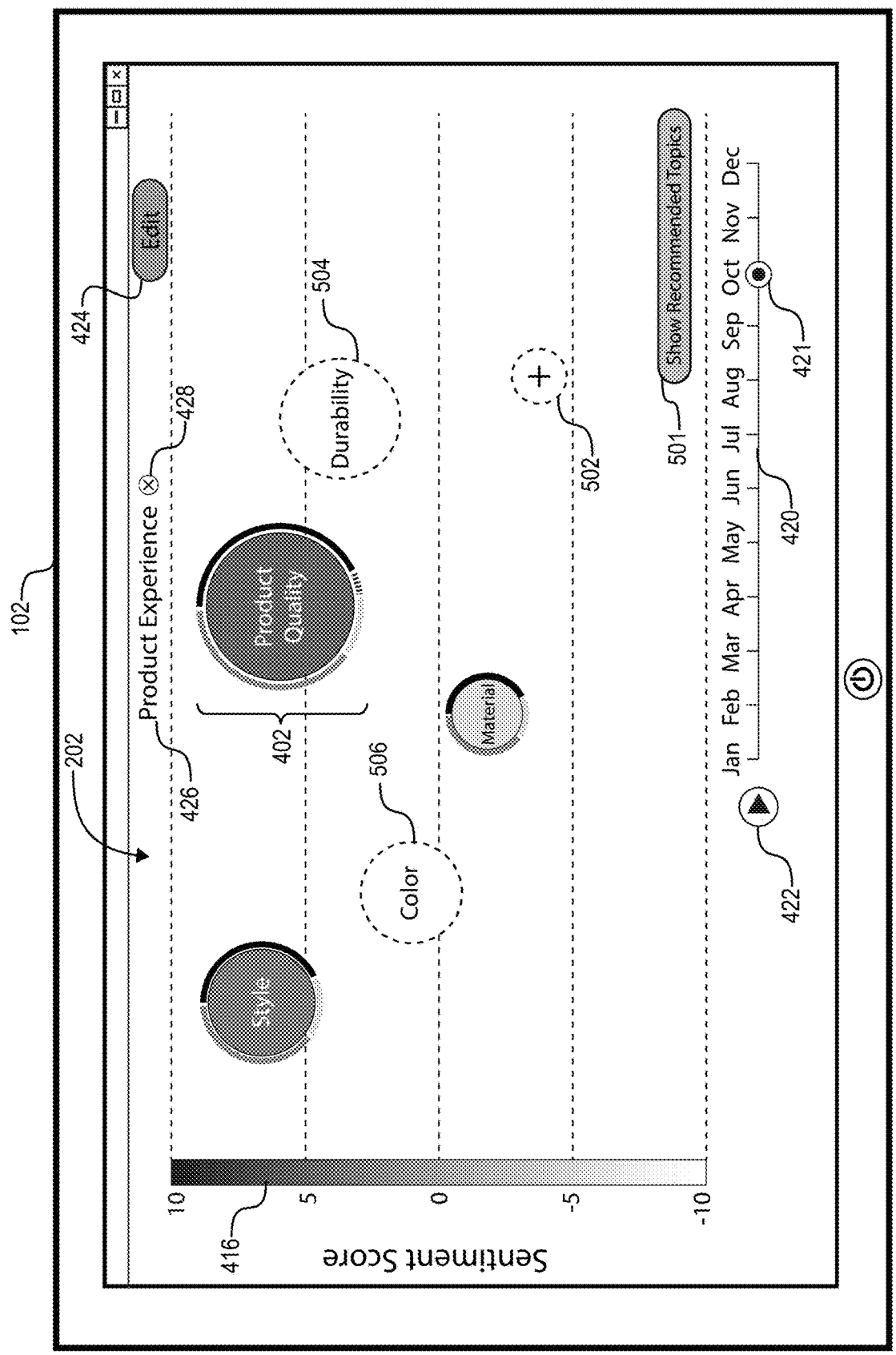
FIGS. 5A-5C illustrate a computing device presenting representative report interfaces in graphical user interfaces in accordance with one or more embodiments.
Figure 5B:
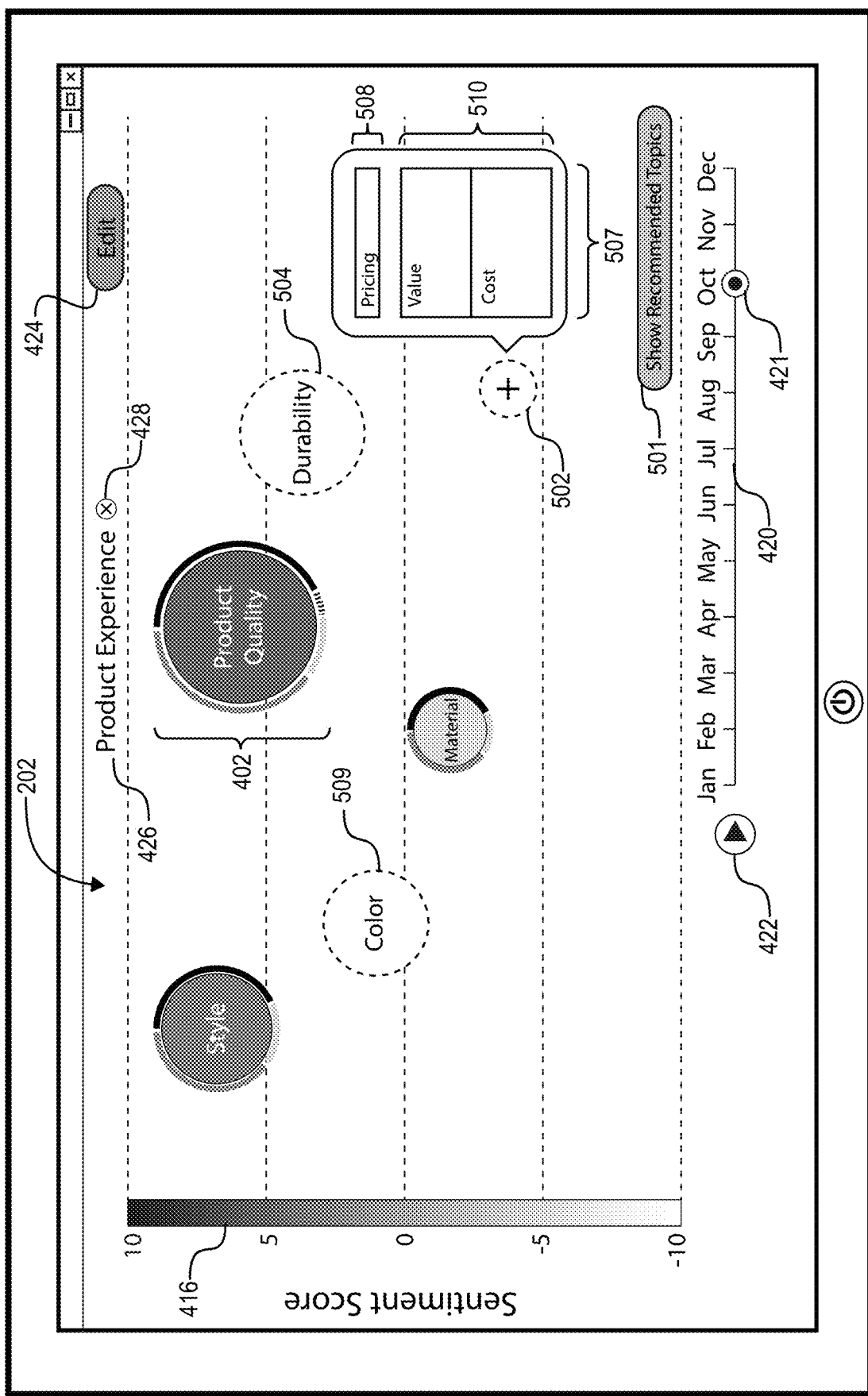
Figure 5C:
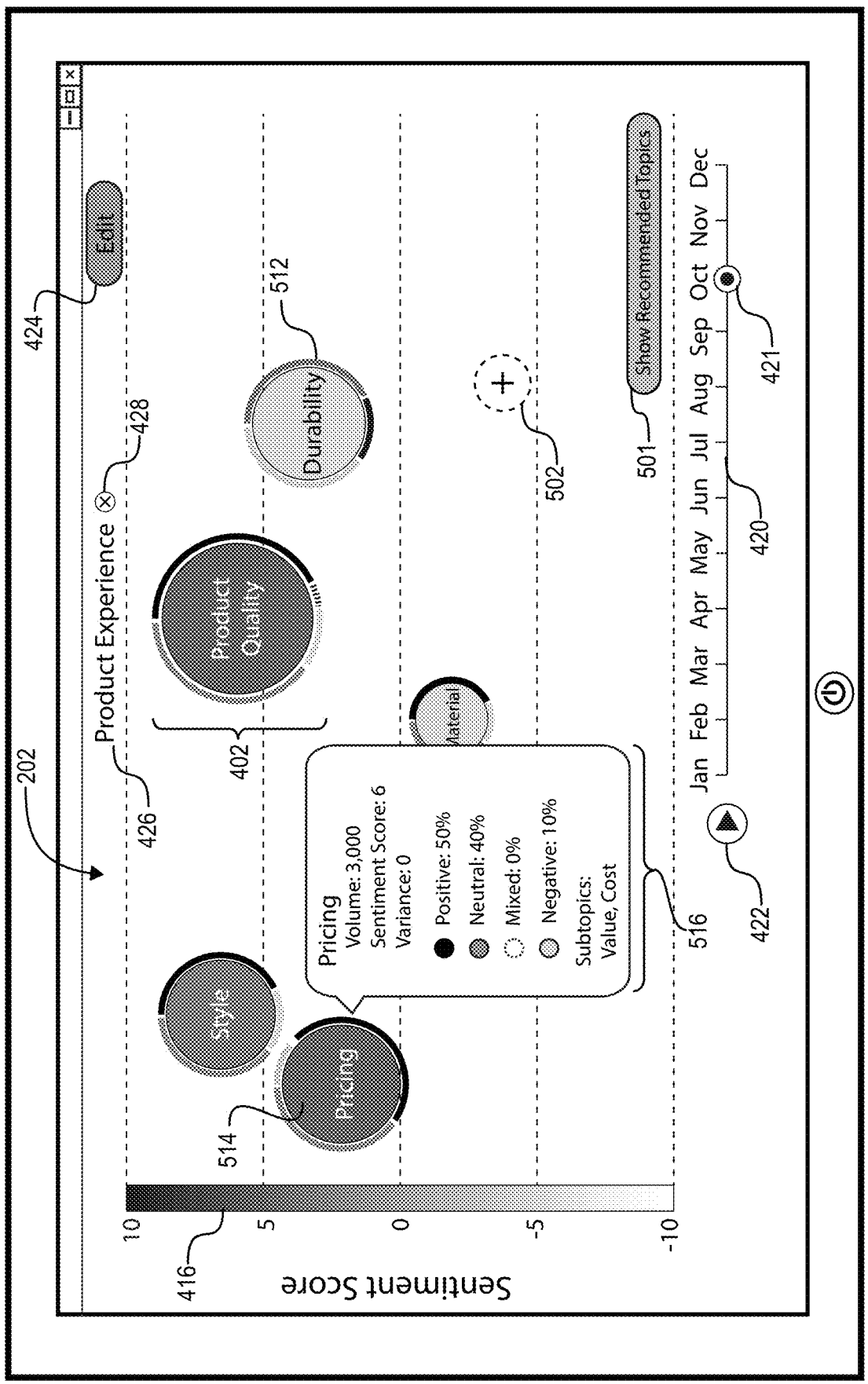

As mentioned above, the system user may enter an editing interface by detecting a user interaction with edit buttons 324, 424. For example, FIGS. 5A-5C show the subtopic views from FIGS. 4A-4C in an editing interface. The editing interface allows users to add additional topics and subtopics, either from topics that the system 100 suggests, or by user input. The system 100 then includes the user-added topics or subtopics in the same report interface area 202 as the other topics or subtopics of a report.

In this editing interface, the user may add topics that the system 100 suggests. The user 106 may add suggested topics to a report by interaction with add suggested topic buttons. As used herein, the terms "suggested topic" or "suggested subtopic" refer to a topic or subtopic not presently included in the hierarchy of topics, but that the system 100 identifies as relevant based on the dataset and suggests at one or more places in the hierarchy. For example, the system 100 can use a keyword detection algorithm to identify keywords within a survey response dataset to predict and provide topic suggestions within the report interface 202. For example, in the editing interface, as shown in FIGS. 5A-5C, the system can detect a user interaction with the show recommended topics button 501 to toggle recommended topics inclusion and exclusion from the report interface area 202. Thus, the system provides or excludes suggested topics with a single user interaction.

As shown in FIG. 5A, the system can provide one or more suggested topic buttons, such as suggested topic buttons 504 and 506. For example, as shown in FIG. 5A the system provides the suggested topics of "Color" and "Durability" under the topic "Product Experience." Of note, the suggested subtopics buttons 504 and 506 can be positioned within the report interface area 202 as a dotted line preview that indicates a sentiment score level for the subtopic (e.g., based on the position with respect to data axis 416. Thus, the system provides the user with a quick visualization of a protentional subtopic to include in a data report prior to adding the subtopic to the data report, which in turn allows the user to quickly decide if the subtopic is relevant. For instance, if a subtopic was associated with a negative sentiment score, a user may want to add the subtopic to determine if there was an issue with the product illustrated in FIG. 5A. On the other hand, if a subtopic is associated with a neutral (e.g., near 0) sentiment score, then a user could determine that the subtopic is likely to not provide very much useful information and thus can determine not to add the subtopic. Thus, the system efficiently provides previews of suggested topics and subtopics that result in a user building a data efficient report that includes only relevant data and does not waste computation resources adding irrelevant data to reports.

In the example show in FIG. 5A, the system 100 identified "Color" and "Durability" as relevant sub-topics based on, for example, the relevance and usage of those terms within the dataset (e.g., the system can determine a statistically relevant amount of usage of the terms "color" and "durability," or synonyms of those terms, within the survey response within the dataset). The add suggested topic buttons 504, 506 allow a user 106 to add suggested topics to a report. The add suggested topic buttons 504, 506 may be activated in response to user input. For example, based on detecting an indication of a user interaction with the suggested topic buttons 504, 506 (e.g., a mouse selection), the system adds the subtopics of "Color" and "Durability." In adding the subtopics to the data report, the system can generate a multidata display element for the added subtopics similar to the multidata display elements described above with respect to FIGS. 3A-3D.

In addition to suggested topics, the system can add a user-generated topic to a report by providing an add user topic button 502. For example, as shown in FIG. 5A, the add user topic button 502 is a circle enclosed by a dotted line, with the "+" symbol shown inside. However, the add user topic button 502 could be any from a wide variety of designs indicating an addition. As discussed in greater detail below, the add user topic button 502 allows a user 106 to add user-generated topics to a report. For example, the system can provide graphical user interface elements to allow a user 106 to add a custom topic to a report based on receiving an indication that the user interacts with the add user topic button 502 within the report interface 202.

When the system 100 receives an indication of a user interaction with the add user topic button 502, the system causes the report interface area 202 to include an add user topic menu 507, as illustrated in FIG. 5B. The add user topic menu 507 allows a user to indicate what topic and/or subtopics he or she would like to add to the report included on the report interface area 202. In at least some embodiments, the add user topic menu 507 includes two user topic input areas 508 and 510. For example, and as shown in FIG. 5B, user topic input areas 508 and 510 are input fields in which the user can type topics and/or subtopics to add to a report. The user topic input areas 508 and 510 may accept input in any way in which a system may receive text. For example, the system can receive user input via the user topic input areas 508, 510 via a virtual or physical keyboard, talk-to-text input, or any other method of receiving textual inputs.

Within the add user topic menu 507, user topic input area 508 shows an input area where the system can receive user input of a topic or subtopic to be included in the report currently included on the report interface area 202. User topic input area 510 shows an input area where the system can receive user input of subtopics of the topic or subtopic entered in user topic input area 508. It will be appreciated that while FIG. 5B shows that user topic input area 510 has two fields to input subtopics, user topic input area 510 may include any number of fields. For example, user topic input area 510 may include a scrolling function so that user topic input area 510 can accommodate any number of input fields.

For example, a user can interact with topic input area 508 to input the text "Pricing" as well as interact with topic input area 510 to input subtopics to "Pricing" as "Value" and "Cost." Based on the user input, the system can analyze the dataset to identify data that is related to "Pricing," and then identify additional data within the "Pricing" data that is related to "Value" and/or "Cost." For instance, the system can perform a keyword search for survey responses within a dataset that include the user-generated term or synonyms of the user-generated term. The system can then perform an analysis on the identified survey responses to determine an overall sentiment score related to the responses, to determine percentages of responses that have a positive, neutral, or negative sentiment score, and/or to determine the number of responses that related to the user-generated term.

Based on the identifying and analyzing the data related to the user-generated term, the system can generate a multidata display element 514, as illustrated in FIG. 5C. In other words, based on the system receiving user interactions with the add topic elements as discussed above, the system can quickly and efficiently provide additional multidata display elements for the additional topics and subtopics within the report interface area 202. For example, as shown in FIG. 5C, in response to user interaction with the add suggested topic button 504 the system 100 has added sub-multidata display element 512 for "Durability" to the report included in report interface area 202. Once added, sub-multidata display element 512 looks and functions in the same or similar way as sub-multidata display element 402 or multidata display element 302, described above.

Similarly, as shown in FIG. 5C, in response to user interaction with the add user topic button 502 and the add user topic menu 507, the system 100 can add sub-multidata display element 514 for "Pricing" to the report included in report interface area 202. Like sub-multidata display element 512, sub-multidata display element 514 looks and functions in the same way as sub-multidata display element 402 or multidata display element 302. Because the user 106 entered sub-topics for "Pricing," the system organizes "Value" and "Cost" as subtopics of "Pricing. Accordingly, and as shown in FIG. 5C, sub-multidata display element 514 includes an activatable display element 516 that shows the sub-topics "Value" and "Cost." Additionally, as described above with regard to multidata display element 302, in response to user interaction with sub-multidata display element 514, the system 100 will cause the report interface area 202 to include a data report in a sub-topics view for "Pricing."

Figure 6:
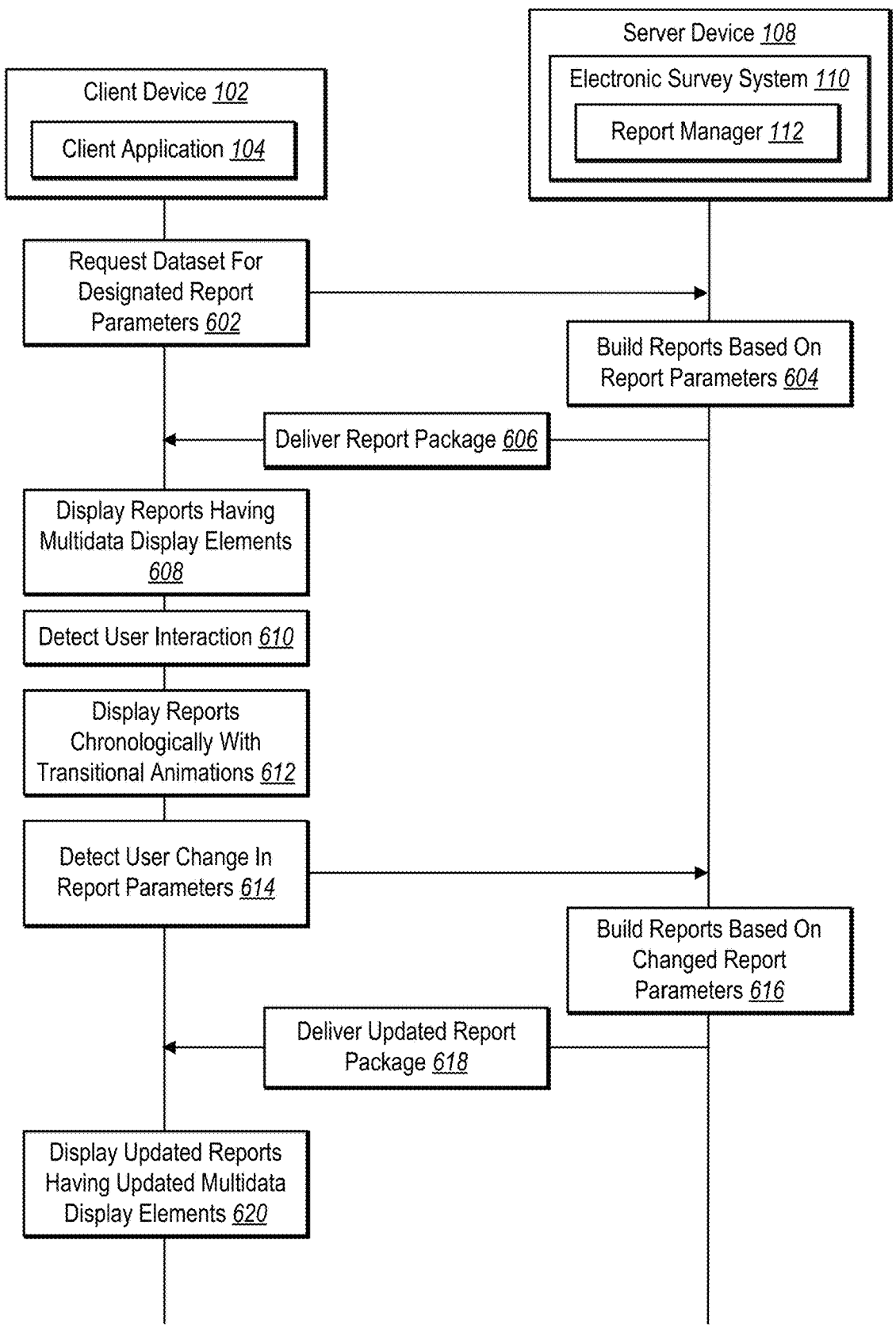
FIG. 6 illustrates a sequence-flow diagram of various acts to provide a report interface in accordance with one or more embodiments.

FIG. 6 illustrates a flow diagram representing a process of building, updating, and displaying reports. As shown in FIG. 6, the flow diagram includes a client device 102 including a client application 104. Additionally, the flow diagram in FIG. 6 includes a server device 108, which includes an electronic survey system 110, which includes a report manager 112. As used herein, the term "report parameters" refers to settings that determine the scope of a report. The report parameters determine what data is presented and how the data is grouped and displayed. For example, "report parameters" can include the designated time intervals for a report, the time period over which reports are generated for, the topics or subtopics included in the report, the data types included in the report, the dataset used to generate the report, the amount of time to display each report while the timeline activation button 322 is active, or any of a variety of settings for a report. To illustrate, the system 100 could determine, or the user 106 could set, report parameters to show the data of interest to the user 106. The system 100 can allow various user parameters to be set in various embodiments. For example, some embodiments may allow a user to set report parameters only for the time interval and time period of the reports, while other embodiments may allow a user to set report parameters for the time interval and time period of the reports, data categories, data types, types of multidata display elements 302a-c, report interface area 202 layouts, and any other aspect of a report.

As illustrated in FIG. 6, the client application 104 can request a dataset for designated report parameters, as shown in step 602. This request can be based on user-selected report parameters or based on system 100 default parameters. As will be discussed in greater detail with regard to FIG. 7, the report management system 100 may also determine report parameters based on user inputs, and/or based on analysis of the dataset. The report management system 100 may then generate reports with optimal report parameters for the given dataset and user 106. The client application 104 sends this request to the report manager 112.

In response to receiving this request, the report manager 112 can build reports based on the report parameters, as shown in step 604. The report manager 112 builds the reports based on the requested dataset and report parameters. For example, and as discussed in greater detail with regard to FIG. 3, a report may comprise a variety of data types presented in a variety of ways. To illustrate, the report manager 112 would respond to a request with report parameters specifying monthly reports for the year of 2018 for the categories "Product Experience," "Support," and "Shipping" would yield a report similar to the one shown in FIG. 3.

After building the reports, the report manager 112 may then deliver the report package to the client device 102, as shown in step 606. The report manager 112 "bundles" the reports together, along with any data necessary for presentation of the reports to generate a report package. The report manager 112 then delivers the report package to the client device 102. As discussed with regard to FIG. 1, this delivery is over the network 114, which may be any one of various network types.

After receiving the report package, the client application 104 may display reports having multidata display elements 302a-c. As discussed in great detail with regard to FIG. 3, the report interface area 202 may include various reports, and the user may navigate among these reports by interaction with the timeline 320. Additionally, and also as discussed with regard to FIG. 3, these reports may include multidata display elements that display multiple aspects of a dataset with regard to a corresponding topic of data. The client application 104 may then detect a user interaction, as shown in step 610. As discussed in detail with regard to FIG. 3, the system 100 may detect the user interaction at the timeline activation button 322. Additionally, as discussed with regard to FIG. 3, the user interaction may be received in a variety of ways in a variety of embodiments.

In response to this user interaction, the client device 102 may display reports chronologically with transitional animations, as shown in step 612. Again, as discussed in great detail with regard to FIG. 3, this display allows a seamless transition between reports so that the user 106 may view many facets of a large dataset on a single interface and may quickly and easily determine trends in the dataset for data of interest.

In some examples, the client application 104 may detect a change in report parameters, as shown in step 614. As briefly discussed above, this change may be based on user input indicating a user's 102 desire to change the report, add a topic or subtopic, or may be based on system 100 analysis of user input(s). In response to the changed parameters, the client application 104 sends the changed report parameters to the report manager 112.

After receiving these changed report parameters, the report manager 112 may build reports based on the changed report parameters, as shown in step 616. Similar to the process described with regard to step 604, the report manager 112 builds the reports for the requested dataset in accordance with the changed parameters. The report manager 112 may then send the updated report package to the client device 102, as shown in step 618. Finally, upon delivery of the updated report package, the client device 102 may display updated reports having updated multidata display elements 302a-c. The client device 102 displays the updated reports in the same manner as that described with regard to 612, that is it displays the reports as delivered from the report manger 112 in a report interface area 202.

Figure 7:
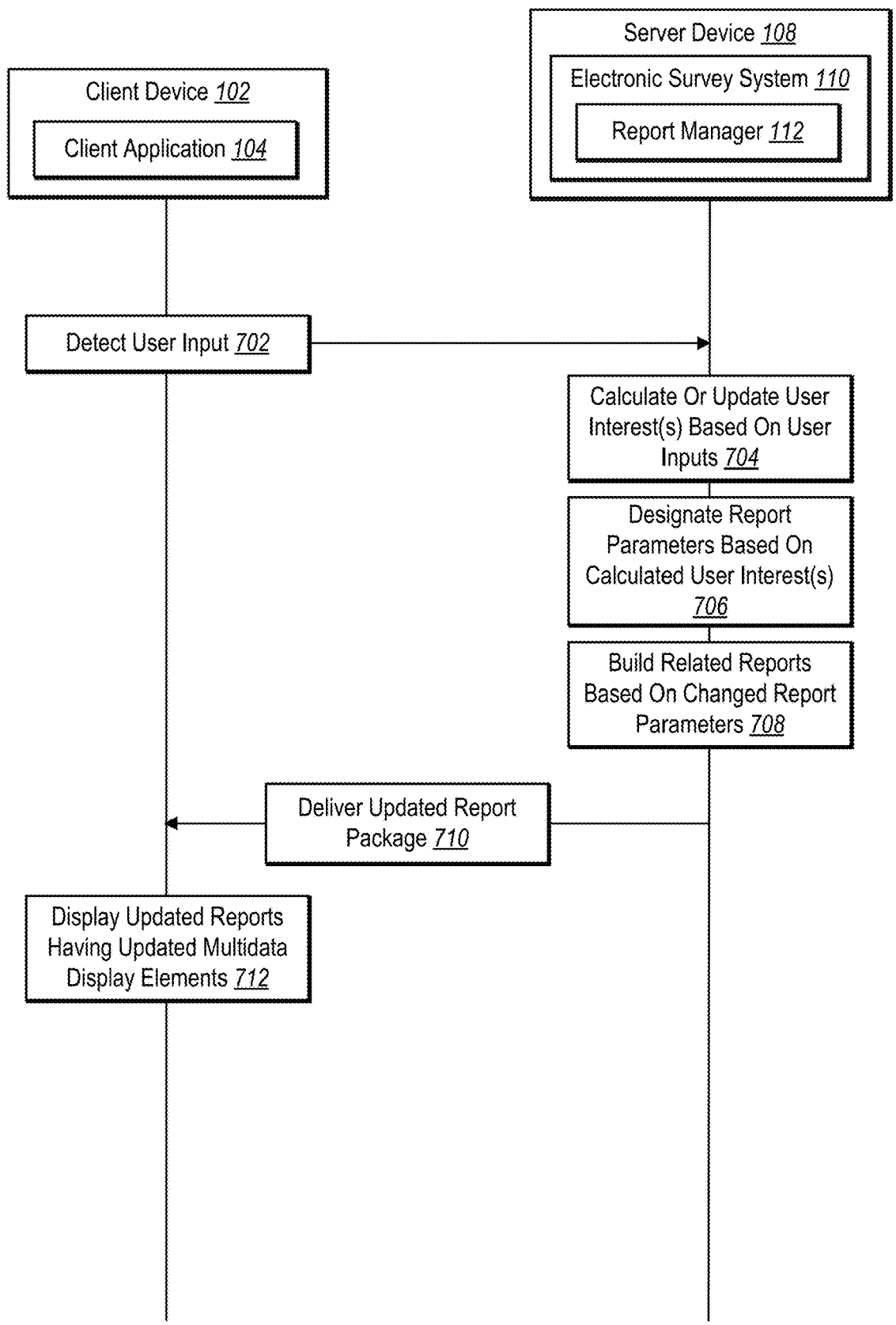
FIG. 7 illustrates sequence-flow diagram of various acts for providing a report interface in accordance with one or more embodiments.

FIG. 7 also illustrates flow diagram representing a process of building, updating, and displaying reports based on optimal report parameters and design as determined by the system 100 based on user interactions with the system 100. Similar to FIG. 6, as shown in FIG. 7., the flow diagram includes a client device 102 including a client application 104. Additionally, the flow diagram in FIG. 6 includes a server device 108, which includes an electronic survey system 110 having a report manager 112.

As illustrated in FIG. 7, the client application 104 may detect user input, as shown in step 702. As discussed in great detail with regard to FIGS. 3-5, the client application 104 may detect a variety of user inputs, including interaction with multidata display elements 302a-c, central active display element 304, outer active display element 306a-c, activatable display element 308, timeline 320, and timeline activation button 322. The client application 104 may also detect user input corresponding to specific reports or time spent with specific reports or specific data types. The client application may then communicate the user input(s) to the report manager 112.

Upon receipt of the monitored user input, the report manager 112 may calculate or update user interest(s) based on user inputs, as shown in step 704. The report manager 112 may analyze user input to determine that a user is particularly interested in a specific data type, specific topics or subtopics, or data from a specific time period. The report manager 112 may, based on these inputs, calculate various user interests that indicate the specific type(s) of data that a user 106 is interested in, and the manner(s) in which the user 106 is interested in viewing that data.

Based on monitoring a user's interactions with a report, the report manager 112 may designate report parameters based on calculated user interest(s), as shown in step 706. As discussed above, report parameters may determine the scope of a report, time period, topics, subtopics, and specific trends (e.g., when sentiment drops a certain amount with respect to a topic). Thus, the report manager 112 may determine the optimal time intervals, categories, topics or subtopics included in the report, data types, or any other report parameter for the report based on the calculated user interest(s). The report management system 100 may also determine an optimal layout for a report based on calculated user interests, and/or based on analysis of the dataset such as the type, volume, and variety of data present in the dataset.

Next, the report manager 112 may build related reports based on changed report parameters, as shown in step 708. This is done in the same manner as steps 604, 616 as discussed above with regard to FIG. 6. That is, the report manager 112 builds report from a dataset based on the designated report parameters. The report manager 112 may then deliver the updated report package 710 to the client device 102, as shown in step 710. Finally, the client device 102 may display the updated reports having updated multidata display elements 302a-d, as shown in step 712. This is done in the same manner as steps 608, 620 discussed above with regard to FIG. 6. That is, the reports are included in the report interface area 202 and may be navigated through via user interaction with the timeline 320 and the timeline activation button 322.

Figure 8:
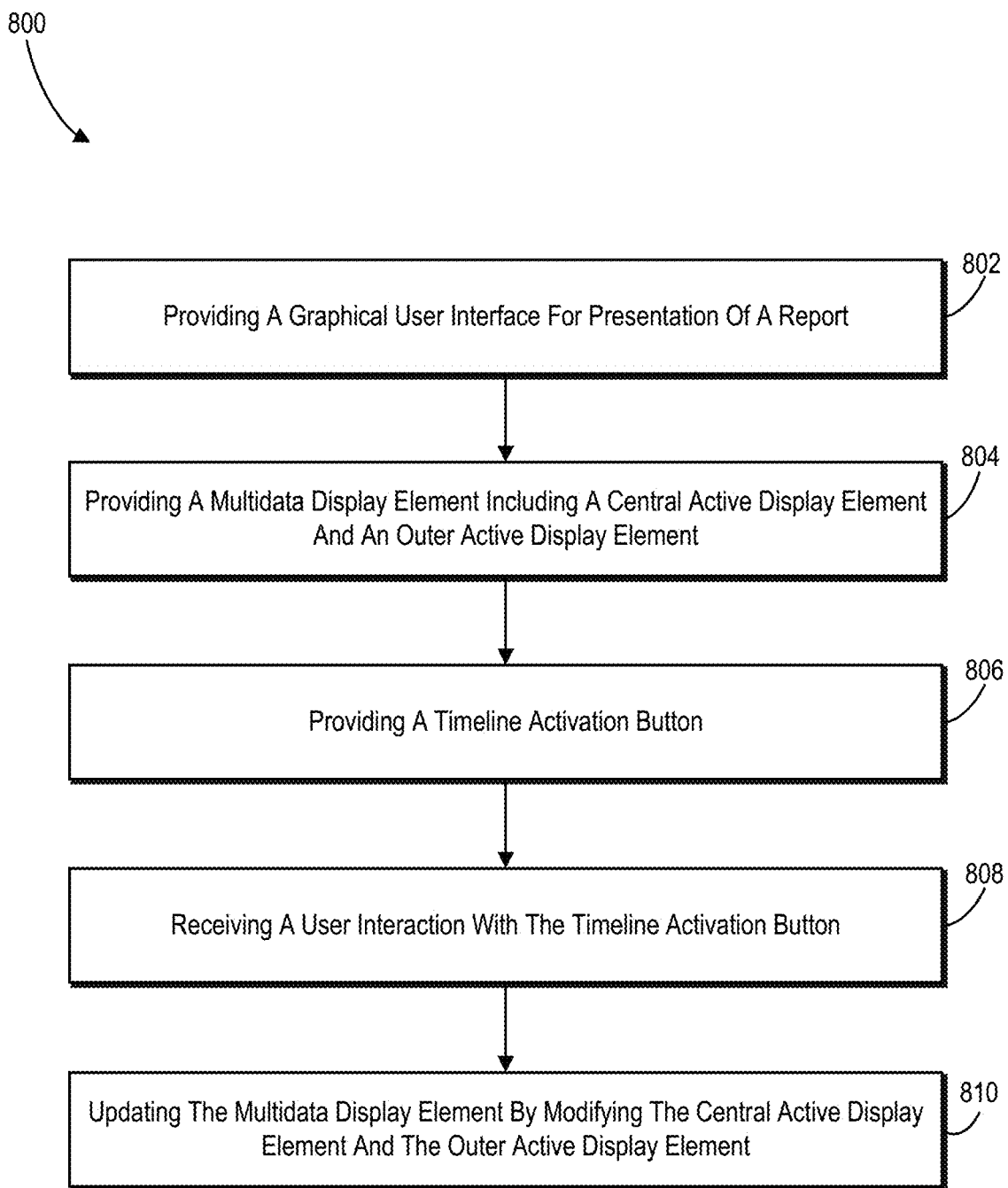
FIG. 8 illustrates a flowchart of a series of acts for providing a report interface in accordance with one or more embodiments.

FIG. 8, the corresponding text, and the examples provide a number of different methods, systems, devices, and non-transitory computer-readable media of the report management system 100. In addition to the foregoing, one or more embodiments can also be described in terms of flowcharts comprising acts for accomplishing a particular result, as shown in FIG. 8. FIG. 8 may be performed with more or fewer acts. Further, the acts may be performed in differing orders. Additionally, the acts described herein may be repeated or performed in parallel with one another or parallel with different instances of the same or similar acts.

As mentioned, FIG. 8 illustrates a flowchart of a series of acts 800 in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As illustrated in FIG. 8, the method 800 includes an act 802 of providing a graphical user interface 200 for presentation of a report. For example, the act 802 can involve providing a graphical user interface for presentation of a report associated with a dataset. Additionally, as shown in FIG. 8, the method 800 includes an act 804 of providing a multidata display element including a central active display element and an outer active display element. For example, act 804 can include a providing a multidata display element comprising a central active display element and an outer active display element for visualizing data related to a topic corresponding to a first time period within the dataset. The central active display element 304 may relate to a first type of data and the outer active display element 306a-d may relate to a second type of data. The system 100 may present multidata display elements 302a-c, 402 by performing the acts of determining a hierarchy of categories and sub-categories based on the dataset; and displaying one or more multidata display elements 302a-c, 402 in accordance with the hierarchy of categories and sub-categories.

The system 100 may also perform the acts of detecting a first user input associated with a multidata display element 302a, and displaying, in response to the first user input associated with the multidata display element 302a, an activatable display element 308. This activatable display element 308 may comprise a first detail portion 310 corresponding to the central active display element 304, a second detail portion 312 corresponding to the outer active display element 306a-d, and an additional detail portion 314 not corresponding to any active display element. Further, the system may perform the acts of detecting a second user input associated with the multidata display element 302a, and displaying, in response to the second user input associated with the multidata display element 302a, a report interface area 202 comprising one or more sub-multidata display elements 402 associated with the multidata display element 302a. In addition to presentation of a multidata display element 302a, the system 100 may perform the act of detecting a user input associated with a suggested topic, and displaying, in response to the user input, a multidata display element 512 related to the suggested topic.

Further, as shown in FIG. 8, the method 800 includes an act 806 of providing a timeline activation button 322. For example, the act 806 can include providing a graphical user interface 200 comprising a timeline activation button 322. In one or more embodiments, as shown in FIG. 8, the method 800 also includes an act 808 of receiving a user interaction with the timeline activation button 322. Additionally, as shown in FIG. 8, the method 800 includes an act 810 of updating the multidata display element 302 by modifying the central active display element 304 and the outer active display element 306a-d. For example, the act 810 can include, based on receiving the user interaction with the timeline activation button, updating the multidata display element by modifying the central active display element and the outer active display element based on data corresponding to a second time period.

Embodiments of the present disclosure can comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein can be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions can be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure can be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure can also be practiced in distributed system environments where local and remote computer systems, which are linked (either by hardwired data links, wireless data links, or by a combination of hardwired and wireless data links) through a network, both perform tasks. In a distributed system environment, program modules can be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
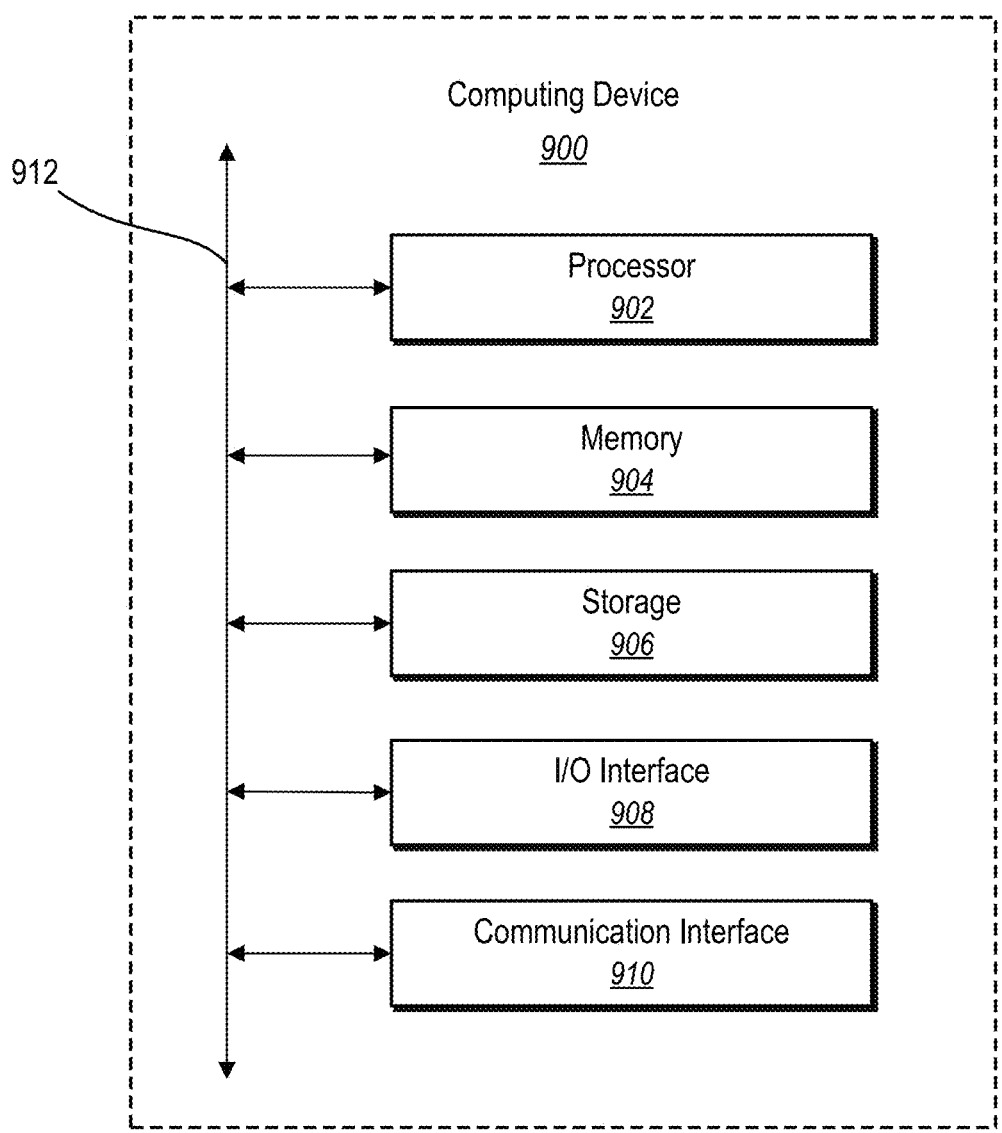
FIG. 9 illustrates a block diagram of an example computing device for implementing one or more embodiments of the present disclosure.

FIG. 9 illustrates a block diagram of exemplary computing device 900 that can be configured to perform one or more of the processes described above. One will appreciate that one or more computing devices such as the computing device 900 can implement the various devices of the environment of FIG. 1. As shown by FIG. 9, the computing device 900 can comprise a processor 902, a memory 904, a storage device 906, an I/O interface 908, and a communication interface 910, which can be communicatively coupled by way of a communication infrastructure 912. While an exemplary computing device 900 is shown in FIG. 9, the components illustrated in FIG. 9 are not intended to be limiting. Additional or alternative components can be used in other embodiments. Furthermore, in certain embodiments, the computing device 900 can include fewer components than those shown in FIG. 9. Components of the computing device 900 shown in FIG. 9 will now be described in additional detail.

In one or more embodiments, the processor 902 includes hardware for executing instructions, such as those making up a computer program. As an example and not by way of limitation, to execute instructions, the processor 902 can retrieve (or fetch) the instructions from an internal register, an internal cache, the memory 904, or the storage device 906 and decode and execute them. In one or more embodiments, the processor 902 can include one or more internal caches for data, instructions, or addresses. As an example and not by way of limitation, the processor 902 can include one or more instruction caches, one or more data caches, and one or more translation lookaside buffers (TLBs). Instructions in the instruction caches can be copies of instructions in the memory 904 or the storage 906.

The memory 904 can be used for storing data, metadata, and programs for execution by the processor(s). The memory 904 can include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 can be internal or distributed memory.

The storage device 906 includes storage for storing data or instructions. As an example and not by way of limitation, storage device 906 can comprise a non-transitory storage medium described above. The storage device 906 can include a hard disk drive (HDD), a floppy disk drive, flash memory, an optical disc, a magneto-optical disc, magnetic tape, or a Universal Serial Bus (USB) drive or a combination of two or more of these. The storage device 906 can include removable or non-removable (or fixed) media, where appropriate. The storage device 906 can be internal or external to the computing device 900. In one or more embodiments, the storage device 906 is non-volatile, solid-state memory. In other embodiments, the storage device 906 includes read-only memory (ROM). Where appropriate, this ROM can be mask programmed ROM, programmable ROM (PROM), erasable PROM (EPROM), electrically erasable PROM (EEPROM), electrically alterable ROM (EAROM), or flash memory or a combination of two or more of these.

The I/O interface 908 allows a user to provide input to, receive output from, and otherwise transfer data to and receive data from computing device 900. The I/O interface 908 can include a mouse, a keypad or a keyboard, a touch screen, a camera, an optical scanner, network interface, modem, other known I/O devices or a combination of such I/O interfaces. The I/O interface 908 can include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data can be representative of one or more graphical user interfaces and/or any other graphical content as can serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 can include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 910 can facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks can be wired or wireless. As an example, the communication interface 910 can facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 910 can facilitate communications various communication protocols. Examples of communication protocols that can be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 912 can include hardware, software, or both that couples components of the computing device 900 to each other. As an example and not by way of limitation, the communication infrastructure 912 can include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 10:
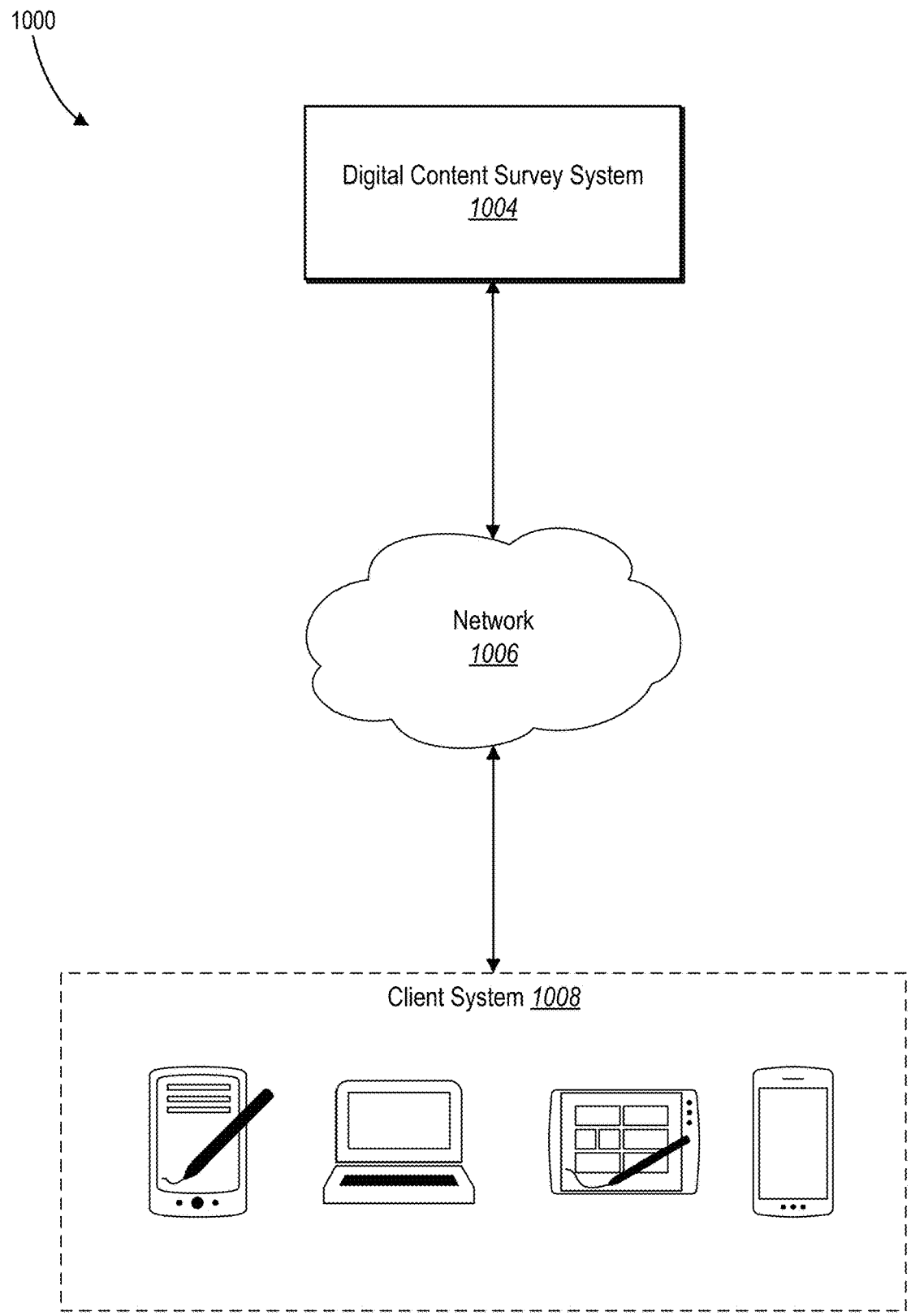
FIG. 10 illustrates a network environment of a digital survey system in accordance with one or more embodiments.

FIG. 10 illustrates an example network environment 1000 for a survey system 102. Network environment 1000 includes a client device 1006, and a server device 1002 connected to each other by a network 1004. Although FIG. 10 illustrates a particular arrangement of client device 1006, server device 1002, and network 1004, this disclosure contemplates any suitable arrangement of client device 1006, server device 1002, and network 1004. As an example and not by way of limitation, two or more of client device 1006, and server device 1002 can be connected to each other directly, bypassing network 1004. As another example, two or more of client device 1006 and server device 1002 can be physically or logically co-located with each other in whole, or in part. Moreover, although FIG. 10 illustrates a particular number of client devices 1006, server devices 1002, and networks 1004, this disclosure contemplates any suitable number of client devices 1006, server devices 1002, and networks 1004. As an example and not by way of limitation, network environment 1000 can include multiple client devices 1006, server devices 1002, and networks 1004.

This disclosure contemplates any suitable network 1004. As an example and not by way of limitation, one or more portions of network 1004 can include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1004 can include one or more networks 1004.

Links can connect client device 1006, and server device 1002 to communication network 1004 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links can differ in one or more respects from one or more second links.

In particular embodiments, client device 1006 can be an electronic device including hardware, software, or embedded logic components or a combination of two or more such components and capable of carrying out the appropriate functionalities implemented or supported by client device 1006. As an example and not by way of limitation, a client device 1006 can include any of the computing devices discussed above in relation to FIG. 9. A client device 1006 can enable a network user at client device 1006 to access network 1004. A client device 1006 can enable its user to communicate with other users at other client devices or systems.

In particular embodiments, client device 1006 can include a web browser, such as MICROSOFT INTERNET EXPLORER, GOOGLE CHROME, or MOZILLA FIREFOX, and can have one or more add-ons, plug-ins, or other extensions, such as TOOLBAR or YAHOO TOOLBAR. A user at client device 1006 can enter a Uniform Resource Locator (URL) or other address directing the web browser to a particular server (such as server, or a server associated with a third-party system), and the web browser can generate a Hyper Text Transfer Protocol (HTTP) request and communicate the HTTP request to server. The server can accept the HTTP request and communicate to client device 1006 one or more Hyper Text Markup Language (HTML) files responsive to the HTTP request. Client device 1006 can render a webpage based on the HTML files from the server for presentation to the user. This disclosure contemplates any suitable webpage files. As an example and not by way of limitation, webpages can render from HTML files, Extensible Hyper Text Markup Language (XHTML) files, or Extensible Markup Language (XML) files, according to particular needs. Such pages can also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser can use to render the webpage) and vice versa, where appropriate.

In particular embodiments, server device 1002 can include a variety of servers, sub-systems, programs, modules, logs, and data stores. In particular embodiments, server device 1002 can include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 1002 can also include suitable components such as network interfaces, security mechanisms, load balancers, failover servers, management-and-network-operations consoles, other suitable components, or any suitable combination thereof.

In particular embodiments, server device 1002 can include one or more user-profile stores for storing user profiles. A user profile can include, for example, biographic information, demographic information, behavioral information, social information, or other types of descriptive information, such as work experience, educational history, hobbies or preferences, interests, affinities, or location. Interest information can include interests related to one or more categories. Categories can be general or specific.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method, comprising:
providing a graphical user interface for presentation of a report associated with a dataset, the graphical user interface comprising:
a multidata display element comprising a first active display element and a second active display element for visualizing a plurality of data characteristics of data related to a topic corresponding to a first time period within the dataset, the first active display element comprising a first visual attribute indicating a value corresponding to a first data characteristic of the data related to the topic and the second active display element comprising a second visual attribute indicating a value corresponding to a second data characteristic of the data related to the topic;
a data axis with values corresponding to the first data characteristic and the multidata display element at a position along the data axis according to the first data characteristic of the data for the first time period; and
a timeline activation button;
receiving a user interaction with the timeline activation button; and
based on receiving the user interaction with the timeline activation button, updating the multidata display element by modifying the first active display element and the second active display element based on data corresponding to a second time period within the dataset and updating the position of the multidata display element along the data axis according to the first data characteristic of the data for the second time period.

2. The computer-implemented method as recited in claim 1, further comprising:
determining a hierarchy of topics based on the dataset; and
providing, for display within the graphical user interface, the multidata display element associated with a first topic from the hierarchy of topics and an additional multidata display element associated with a second topic from the hierarchy of topics.

3. The computer-implemented method as recited in claim 1, further comprising:
determining a hierarchy of topics and sub-topics based on the dataset, wherein the multidata display element is associated with a first topic; and
based on upon receiving an indication of a user interaction with the multidata display element, providing, for display within the graphical user interface, an additional multidata display element associated with a sub-topic corresponding to the first topic.

4. The computer-implemented method as recited in claim 1, further comprising:
receiving an indication of a first user input associated with the multidata display element; and
providing, for display within the graphical user interface and in response to the first user input, an activatable display element.

5. The computer-implemented method as recited in claim 4, wherein the activatable display element comprises a first detail portion corresponding to the first active display element, a second detail portion corresponding to the second active display element, and an additional detail portion not corresponding to any active display element.

6. The computer-implemented method as recited in claim 4, further comprising:
receiving an indication of a second user input associated with the multidata display element; and
providing, for display within the graphical user interface and in response to the second user input, one or more sub-multidata display elements associated with the multidata display element.

7. The computer-implemented method as recited in claim 1, wherein providing the graphical user interface comprises providing, for display within the graphical user interface, the first active display element comprising an additional visual attribute indicating an additional value corresponding to an additional data characteristic of the data related to the topic.

8. A non-transitory computer-readable medium storing instructions that, when executed by at least one processor, cause a computer device to:
provide a graphical user interface for presentation of a report associated with a dataset, the graphical user interface comprising:
a multidata display element comprising a first active display element and a second active display element for visualizing a plurality of data characteristics of data related to a topic corresponding to a first time period within the dataset, the first active display element comprising a first value attribute indicating a value corresponding to a first data characteristic of the data related to the topic and the second active display element comprising a second visual attribute indicating a value corresponding to a second data characteristic of the data related to the topic;
a data axis with values corresponding to the first data characteristic and the multidata display element at a position along the data axis according to the first data characteristic of the data for the first time period; and
a timeline activation button;
receive a user interaction with the timeline activation button; and
based on receiving the user interaction with the timeline activation button, update the multidata display element by modifying the first active display element and the second active display element based on data corresponding to a second time period within the dataset and updating the position of the multidata display element along the data axis according to the first data characteristic of the data for the second time period.

9. The non-transitory computer-readable medium of claim 8, further comprising instructions that, when executed by the at least one processor, cause the computer device to:
determine a hierarchy of topics based on the dataset; and
provide, for display within the graphical user interface, the multidata display element associated with a first topic from the hierarchy of topics and an additional multidata display element associated with a second topic from the hierarchy of topics.

10. The non-transitory computer-readable medium of claim 8, further comprising instructions that, when executed by the at least one processor, cause the computer device to:
determine a hierarchy of topics and sub-topics based on the dataset, wherein the multidata display element is associated with a first topic; and
based on upon receiving an indication of a user interaction with the multidata display element, provide, for display within the graphical user interface, an additional multidata display element associated with a sub-topic corresponding to the first topic.

11. The non-transitory computer-readable medium of claim 8, further comprising instructions that, when executed by the at least one processor, cause the computer device to:
receive an indication of a first user input associated with the multidata display element; and provide, for display within the graphical user interface and in response to the first user input, an activatable display element.

12. The non-transitory computer-readable medium of claim 11, wherein the activatable display element comprises a first detail portion corresponding to the first active display element, a second detail portion corresponding to the second active display element, and an additional detail portion not corresponding to any active display element.

13. The non-transitory computer-readable medium of claim 11, further comprising instructions that, when executed by the at least one processor, cause the computer device to:
receive an indication of a second user input associated with the multidata display element; and
provide, for display within the graphical user interface and in response to the second user input, one or more sub-multidata display elements associated with the multidata display element.

14. The non-transitory computer-readable medium of claim 8, further comprising instructions that, when executed by the at least one processor, cause the computer device to provide, for display within the graphical user interface, the second active display element comprising an additional visual attribute corresponding to an additional data characteristic of the data related to the topic.

15. A system comprising:
at least one processor; and
at least one non-transitory computer-readable storage medium storing instructions that, when executed by the at least one processor, cause the system to:
provide a graphical user interface for presentation of a report associated with a dataset, the graphical user interface comprising:
a multidata display element comprising a first active display element and a second active display element for visualizing a plurality of data characteristics of data related to a topic corresponding to a first time period within the dataset, the first active display element comprising a first visual attribute indicating a value corresponding to a first data characteristic of the data related to the topic and the second active display element comprising a second visual attribute indicating a value corresponding to a second data characteristic of the data related to the topic;
a data axis with values corresponding to the first data characteristic and the multidata display element at a position along the data axis according to the first data characteristic of the data for the first time period; and
a timeline activation button;
receive a user interaction with the timeline activation button; and
based on receiving the user interaction with the timeline activation button, update the multidata display element by modifying the first active display element and the second active display element based on data corresponding to a second time period within the dataset and updating the position of the multidata display element along the data axis according to the first data characteristic of the data for the second time period.

16. The system of claim 15, further comprising instructions that, when executed by the at least one processor, cause the system to:
determine a hierarchy of topics based on the dataset; and
provide, for display within the graphical user interface, the multidata display element associated with a first topic from the hierarchy of topics and an additional multidata display element associated with a second topic from the hierarchy of topics.

17. The system of claim 15, further comprising instructions that, when executed by the at least one processor, cause the system to:
determine a hierarchy of topics and sub-topics based on the dataset, wherein the multidata display element is associated with a first topic; and
based on upon receiving an indication of a user interaction with the multidata display element, provide, for display within the graphical user interface, an additional multidata display element associated with a sub-topic corresponding to the first topic.

18. The system of claim 15, further comprising instructions that, when executed by the at least one processor, cause the system to:
receive an indication of a first user input associated with the multidata display element; and
provide, for display within the graphical user interface and in response to the first user input, an activatable display element.

19. The system of claim 18, further comprising instructions that, when executed by the at least one processor, cause the system to:
receive an indication of a second user input associated with the multidata display element; and
provide, for display within the graphical user interface and in response to the second user input, one or more sub-multidata display elements associated with the multidata display element.

20. The system of claim 15, further comprising instructions that, when executed by the at least one processor, cause the system to:
provide, for display within the graphical user interface and based on the dataset, a suggested topic;
receive an indication of a user input associated with the suggested topic; and
provide, for display within the graphical user interface and in response to the user input, a multidata display element related to the suggested topic.

* * * * *